(12) United States Patent
Otake et al.

(10) Patent No.: US 12,471,864 B2
(45) Date of Patent: Nov. 18, 2025

(54) DIAGNOSTIC METHOD, TREATMENT METHOD AND MEDICAL SYSTEM

(71) Applicant: TERUMO KABUSHIKI KAISHA, Tokyo (JP)

(72) Inventors: Yuya Otake, Fujinomiya (JP);
Haruhiko Takahashi, Tokyo (JP);
Haruhiko Kamijo, Hadano (JP);
Tetsuya Fukuoka, Hadano (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 799 days.

(21) Appl. No.: 16/265,179

(22) Filed: Feb. 1, 2019

(65) Prior Publication Data
US 2019/0231291 A1 Aug. 1, 2019

(30) Foreign Application Priority Data
Feb. 1, 2018 (JP) .................................. 2018-016840

(51) Int. Cl.
*A61B 6/50* (2024.01)
*A61B 6/00* (2024.01)
(Continued)

(52) U.S. Cl.
CPC .............. *A61B 6/504* (2013.01); *A61B 6/032* (2013.01); *A61B 6/481* (2013.01); *A61B 6/5211* (2013.01);
(Continued)

(58) Field of Classification Search
CPC ......... A61B 6/504; A61B 6/032; A61B 6/481; A61B 6/5211; A61M 25/10; A61M 2025/1045
See application file for complete search history.

(56) References Cited

U.S. PATENT DOCUMENTS 6,827,670 B1   12/2004   Stark et al.
7,901,348 B2    3/2011   Soper et al.
(Continued)

FOREIGN PATENT DOCUMENTS

DE   20 2017 106 016 U1   12/2017
JP      2009-273640 A     11/2009
(Continued)

OTHER PUBLICATIONS

Maldonado, T.S., et al., "Treatment of Aortoiliac Occlusive Disease with the Endologix AFX Unibody Endograft," European Journal of Endovascular Surgery. vol. 52, 2016. p. 64-74 (Year: 2016).*
(Continued)

*Primary Examiner* — Sean A Frith
(74) *Attorney, Agent, or Firm* — Buchanan Ingersoll & Rooney PC

(57) ABSTRACT

A diagnostic method, a treatment method and a medical system are capable of selecting reasonably and effectively a favorable order of treatments capable of achieving desired effects when lesion areas in both left and right lower limb arteries are treated in order from an artery of an arm. The method of treating a patient having lesion areas X in both left and right lower limb arteries involves determining the lesion area X to be treated first, based on at least the two pieces of selected comparative information on each of the lesion areas X.

19 Claims, 13 Drawing Sheets

(51) Int. Cl.
*A61B 6/03* (2006.01)
*A61M 25/10* (2013.01)

(52) U.S. Cl.
CPC ..... *A61M 25/10* (2013.01); *A61M 2025/1045* (2013.01)

(56) References Cited

U.S. PATENT DOCUMENTS

| | | | |
|---|---|---|---|
| 8,935,099 B2* | 1/2015 | Partain | G16H 50/30 702/22 |
| 9,642,586 B2 | 5/2017 | Kelm et al. | |
| 10,133,846 B2 | 11/2018 | Takata et al. | |
| 2006/0271090 A1* | 11/2006 | Shaked | A61B 17/12136 606/192 |
| 2007/0092864 A1 | 4/2007 | Reinhardt et al. | |
| 2008/0215018 A1* | 9/2008 | Duffy | A61F 2/958 604/284 |
| 2009/0156895 A1 | 6/2009 | Higgins et al. | |
| 2011/0118595 A1 | 5/2011 | Aulbach et al. | |
| 2012/0220840 A1 | 8/2012 | Morita et al. | |
| 2013/0268047 A1* | 10/2013 | Bourang | A61F 2/844 623/1.11 |
| 2014/0037049 A1* | 2/2014 | Langan | A61B 6/0487 378/20 |
| 2014/0358123 A1 | 12/2014 | Ueda et al. | |
| 2015/0051480 A1 | 2/2015 | Hwang et al. | |
| 2015/0087957 A1 | 3/2015 | Liu et al. | |
| 2015/0117730 A1 | 4/2015 | Takayama | |
| 2015/0157802 A1 | 6/2015 | Yoon | |
| 2015/0262357 A1 | 9/2015 | Igarashi et al. | |
| 2015/0265162 A1 | 9/2015 | Lavi et al. | |
| 2015/0379708 A1 | 12/2015 | Abramoff et al. | |
| 2016/0022371 A1* | 1/2016 | Sauer | G16H 30/40 600/407 |
| 2016/0045180 A1 | 2/2016 | Kelm et al. | |
| 2016/0136394 A1* | 5/2016 | Kobayashi | A61M 25/0147 604/510 |
| 2016/0148371 A1 | 5/2016 | Itu et al. | |
| 2016/0148372 A1* | 5/2016 | Itu | G16H 50/20 382/128 |
| 2016/0157787 A1 | 6/2016 | Merritt et al. | |
| 2016/0157802 A1 | 6/2016 | Anderson | |
| 2016/0157807 A1* | 6/2016 | Anderson | A61B 6/032 600/407 |
| 2017/0076014 A1 | 3/2017 | Bressloff | |
| 2017/0116732 A1* | 4/2017 | Britzen | A61B 6/463 |
| 2017/0281131 A1 | 10/2017 | Sendai | |
| 2017/0311917 A1 | 11/2017 | Allmendinger et al. | |
| 2017/0325696 A1* | 11/2017 | Yoshida | A61B 5/02007 |
| 2018/0049759 A1* | 2/2018 | Thomas | A61M 25/1011 |
| 2018/0078313 A1 | 3/2018 | Comaniciu et al. | |
| 2018/0092615 A1 | 4/2018 | Sakaguchi et al. | |
| 2018/0104445 A1* | 4/2018 | Fuller | A61M 25/10 |
| 2018/0243033 A1* | 8/2018 | Tran | A61B 5/02007 |
| 2019/0117087 A1 | 4/2019 | Yasunaga et al. | |
| 2019/0117088 A1 | 4/2019 | Nomura et al. | |
| 2019/0117089 A1 | 4/2019 | Nomura et al. | |
| 2019/0117090 A1 | 4/2019 | Ishii et al. | |
| 2019/0117181 A1 | 4/2019 | Ishii et al. | |
| 2019/0125192 A1 | 5/2019 | Kusu et al. | |
| 2019/0125193 A1 | 5/2019 | Saito et al. | |
| 2019/0125194 A1 | 5/2019 | Sekine et al. | |
| 2019/0125287 A1 | 5/2019 | Itou et al. | |
| 2019/0150867 A1 | 5/2019 | Itou et al. | |
| 2020/0093543 A1 | 3/2020 | Takahashi et al. | |
| 2020/0126229 A1 | 4/2020 | Lavi et al. | |
| 2020/0155079 A1 | 5/2020 | Kusu et al. | |
| 2020/0155101 A1 | 5/2020 | Yasunaga et al. | |

FOREIGN PATENT DOCUMENTS

| | | |
|---|---|---|
| JP | 2012-005636 A | 1/2012 |
| JP | 2014-128650 A | 7/2014 |
| JP | 2017-79914 A | 5/2017 |
| JP | 2017-536213 A | 12/2017 |
| WO | 2017/083401 A1 | 5/2017 |

OTHER PUBLICATIONS

Macedo et al.: "A bifurcation identifier for IV-OCT using orthogonal least squares and supervised machine learning," Computerized Medical Imaging and Graphics 46 (2015), pp. 237-248.

Alberti et al.: "Automatic Bifurcation Detection in Coronary IVUS Sequences," IEEE Transactions on Biomedical Engineering, vol. 59, No. 4, Apr. 2012, pp. 1022-1031.

Guidotti et al.: "A Survey of Methods for Explaining Black Box Models," ACM Computing Surveys, vol. 51, No. 5, Article 93, p. 93:2-93:42, Aug. 2018.

Sanghvi et al.: "Transradial Intervention of Iliac and Superficial Femoral Artery Disease is Feasible," Journal of Interventional Cardiology, vol. 21, No. 5, pp. 385-387, 2008.

Office Action (Notice of Reasons for Refusal) issued Jun. 28, 2021, by the Japanese Patent Office in corresponding Japanese Patent Application No. 2018-016840 and an English Translation of the Office Action. (6 pages).

* cited by examiner

DIAGNOSTIC METHOD, TREATMENT METHOD AND MEDICAL SYSTEM

CROSS-REFERENCES TO RELATED APPLICATIONS

This application claims priority from Japanese Patent Application No. 2018-016840 filed on Feb. 1, 2018, the entire contents of which are incorporated herein by reference.

TECHNICAL FIELD

The present disclosure generally relates to a method of diagnosing which of one or more lesions in each of a plurality of blood vessels bifurcated from a blood vessel having bifurcations is to be treated first for treating the blood vessel by an intervention procedure.

BACKGROUND DISCUSSION

Ipsilateral puncture, in which a catheter is introduced from an artery on the same leg as that having a lesion, or a contralateral puncture (cross-over method) in which the catheter is introduced from a leg opposite from the leg having the lesion, have been employed to treat an arterial lesion of a lower limb of a biological lumen having a lesion and a bifurcation. However, in recent years, a method of treating by introducing a catheter from an artery of an arm, specifically, a radial artery (TRI: Trans Radial Intervention) may be performed with relatively less physical burden to patients and a relatively shorter stay in the hospital.

For example, Journal of Interventional Cardiology Volume 21, Issue 5 Oct. 2008 Pages 385-387 Transradial Intervention of Iliac and Superficial Femoral Artery Disease is Feasible discloses that a catheter is introduced from an arm to treat percutaneously the iliac artery and a superficial femoral artery (SFA).

U.S. Patent Publication No. 2014/0358123 also discloses a dual catheter assembly configured to be inserted from an arm for treating a lesion of a lower limb artery and a method of continuously treating lesions of left and right lower limbs by optionally selecting the lesion to be treated first.

Japanese Application Publication No. 2017-79914 discloses a method of diagnosing a treatment method by determining whether a guide wire can pass through a lesion with an index CT value indicating the calcification degree of an X-ray CT (computed tomography) image.

Furthermore, Japanese Application Publication No. 2016-41247 discloses a method of reading medical diagnostic images by machine-learning, and ACM Computing Surveys, Vol. 51, No. 5, Article 93. Publication date: August 2018 discloses that interpretation is necessary in deep learning in which classification of images is concealed.

Although Journal of Interventional Cardiology Volume 21, Issue 5 Oct. 2008 Pages 385-387 Transradial Intervention of Iliac and Superficial Femoral Artery Disease is Feasible discloses treatment of lower limb arteries with TRI, there is no description about placing a distal end of a guiding catheter beyond an aortailiac bifurcation and treatment to be performed when lesions are located in both bifurcations.

U.S. Patent Publication No. 2014/0358123 also describes a method of continuously treating lesions present respectively in blood vessels of bifurcated right and left lower limbs. However, the order of treatment is optional.

In addition, Japanese Application Publication No. 2017-79914 discloses software for determining whether the guide wire can pass depending on the degree of calcification, that is, hardness based on X-ray CT image diagnosis. Japanese Application Publication No. 2017-79914 does not disclose temporal factors, that is, which lesion is to be treated first and which is more advantageous to the patient.

In contrast, ACM Computing Surveys, Vol. 51, No. 5, Article 93. Publication date: August 2018 discloses that machine-learning using deep learning is concealed, and interpretation is necessary. In contrast, Japanese Application Publication No. 2016-41247 discloses an image diagnostic method based on machine-learning using deep learning. However, Japanese Application Publication No. 2016-41247 is only for classification and the process of diagnosis is concealed and the reason is not clearly specified. In Article 1-4 (2) of the Medical Care Law of Japan, there is a description "Physicians, dentists, pharmacists, nurses and other providers of medical care shall endeavor to provide appropriate explanations and obtain the understanding of those who receive medical care for providing healthcare". Therefore, the diagnosis and treatment cannot be carried out unless the explanation (informed consent) is made.

In contrast, there has been no diagnostic method which is established by performing treatment by physicians based on diagnoses, revalidating prognosis, and validating and correcting the method of diagnosis. Moreover, there has been no known diagnostic method that automatically corrects reasons for determination in diagnostic based on reinforcement-learning using the result of treatment as remuneration and improves diagnostic accuracy.

However, even in the same lower limb arteries, differences in distance from an aortailiac bifurcation may cause differences in effects of treatment and treatment difficulties.

Shortening an operation time depending on which lesion in the bifurcated blood vessels each having one or more lesions is to be treated first and efficiently using the guiding catheter or a therapeutic catheter is important for reducing the relative burden on patients, shortening or reducing time spent for the procedure, shortening time of using an operating room, and reducing the number of catheters to be use, that is, in terms of medical economics.

SUMMARY

One aspect of the disclosure involves a method for diagnosing lesion areas in a plurality of bifurcated lumens in a body of a patient, wherein the plurality of bifurcated lumens are connected to a biological lumen via a bifurcated portion from a main lumen. The method comprises: acquiring information about the patient; identifying one or more lesion areas present in each of the bifurcated lumens using the acquired information; acquiring plural pieces of information about each of the lumens, and using the plural pieces of information to determine a first lesion area to be treated first amongst the plurality of lesion areas.

The main lumen may be an aorta, the bifurcated portion may be an aortailiac bifurcation, and the plurality of bifurcated lumens may be left and right lower limb arteries.

The plural pieces of information may be used to determine a second lesion area, different from the first lesion area, to be treated after treatment of the first area.

The information may be information about the lesion areas of the patient.

The information may include plural pieces of information about the lesion areas of the patient.

The information may include electromagnetic wave information about the patient obtained based on a changed electromagnetic wave resulting after irradiating the patient with electromagnetic waves and detecting electromagnetic waves obtained through the patient, and the method further comprises acquiring plural pieces of information about each of the lesion areas using the electromagnetic wave information.

The diagnosis may be performed using non-electromagnetic wave information about the patient.

The diagnosis may be performed by assistance by artificial intelligence and/or by the artificial intelligence.

The artificial intelligence may be obtained through machine-learning.

The plural pieces of information may be plural different aspects of each of the lumens.

Another aspect of the disclosure involves a treatment method for treating a patient having lesion areas in both left and right lower limb arteries. The method comprises: selecting, from information about the patient, at least two items of information selected from: i) a position of each lesion area relative to at least an aortailiac bifurcation, ii) a stenosis degree of each lesion area, iii) a bending degree of each lesion area, iv) a length of each lesion area, v) a blood vessel diameter of each lesion area, and vi) a hardness of each lesion area, as comparative information for comparison; determining a first lesion area to be treated first, using at least the two items of selected comparative information on each of the lesion areas; introducing a catheter into an artery of an arm of the patient, and advancing and placing a distal part of the catheter to at least an aorta of the patient; inserting a therapeutic catheter into a lumen of the catheter after the placing of the distal part of the catheter to at least the aorta of the patient, projecting the therapeutic catheter distally beyond the distal part of the catheter, and treating first the first lesion area determined as being treated first by the therapeutic catheter, and treating a second lesion area, which is another lesion area different from the first lesion area, after the treating of the first lesion area.

The selecting of the at least two items of information may include selecting at least the position and the stenosis degree.

The treatment method may further include setting a priority, which is to be used for determining the first lesion area to be treated first, for each of the comparative information, and the determination of the first lesion area to be treated may first include: determining whether or not to determine the first lesion area to be treated first, based on at least the two items of comparative information, which has the highest priority, on each of the plurality of lesion areas; and determining the first lesion area to be treated first based on the comparative information when it is determined that the first lesion area to be treated first is to be determined.

The determination of the first lesion area to be treated first may further include: determining whether or not to determine the first lesion area to be treated first based on the comparative information having a next priority when it is determined, in the determination of whether or not to determine the first lesion area to be treated first, that the first lesion area to be treated first is not to be determined.

The treatment method may further include setting a priority, which is to be used for determining the first lesion area to be treated first, for each of the comparative information, and the determination of the first lesion area to be treated first may include: determining whether or not to determine the first lesion area to be treated first, by sequentially using the comparative information from the comparative information having the higher priority; and determining whether or not to determine the first lesion area to be treated first using the comparative information having a next priority when it is determined that the first lesion area to be treated first is not to be determined.

The catheter may also be used in treating the second lesion area after the treating of the first lesion area.

The therapeutic catheter may also be used in treating the second lesion area after the treating of the first lesion area.

After treating the first lesion area to be treated first, the therapeutic catheter may be removed from the catheter, and a second therapeutic catheter may be used in treating the second lesion area after the treating of the first lesion area.

The catheter may be a guiding catheter, and a catheter assembly having an inner catheter inserted in a lumen of the guiding catheter may be used in the placing of the distal part of the catheter to at least the aorta of the patient.

Another aspect involves a medical system that includes: an interface configured to receive information on a patient to be input; a control unit configured to receive, from the interface, at least two items of information selected from the position of a lesion area relative to an aortailiac bifurcation of the patient, the stenosis degree of the lesion area, the bending degree of the lesion area, the length of the lesion area, the blood vessel diameter of the lesion area and the hardness of the lesion area, as comparative information for comparison, or to calculate at least the two items of information from the received information, as the comparative information, and to determine a first lesion area to be treated first on the basis of at least the two items of selected comparative information on each of the lesion areas; and an output unit configured to output a result determined in the control unit.

According to the diagnostic method, the treatment method and the medical system configured as described above, the first lesion area to be treated first is determined using at least the two pieces or items of information on the patient. Therefore, as compared to a configuration where one piece or item of information about the patient is used, it is possible to select reasonably and effectively a favorable order of treatments capable of achieving the desired effects.

When selecting at least the two pieces or items of information, as the comparative information, at least the information on the distance and the stenosis degree may be selected. Thereby, the treatment method can effectively determine the lesion area to be treated first by using the distance and the stenosis degree, which are factors highly relating to the influences on the difficulty level of the procedure and the biological body.

DETAILED DESCRIPTION

Figure 1:
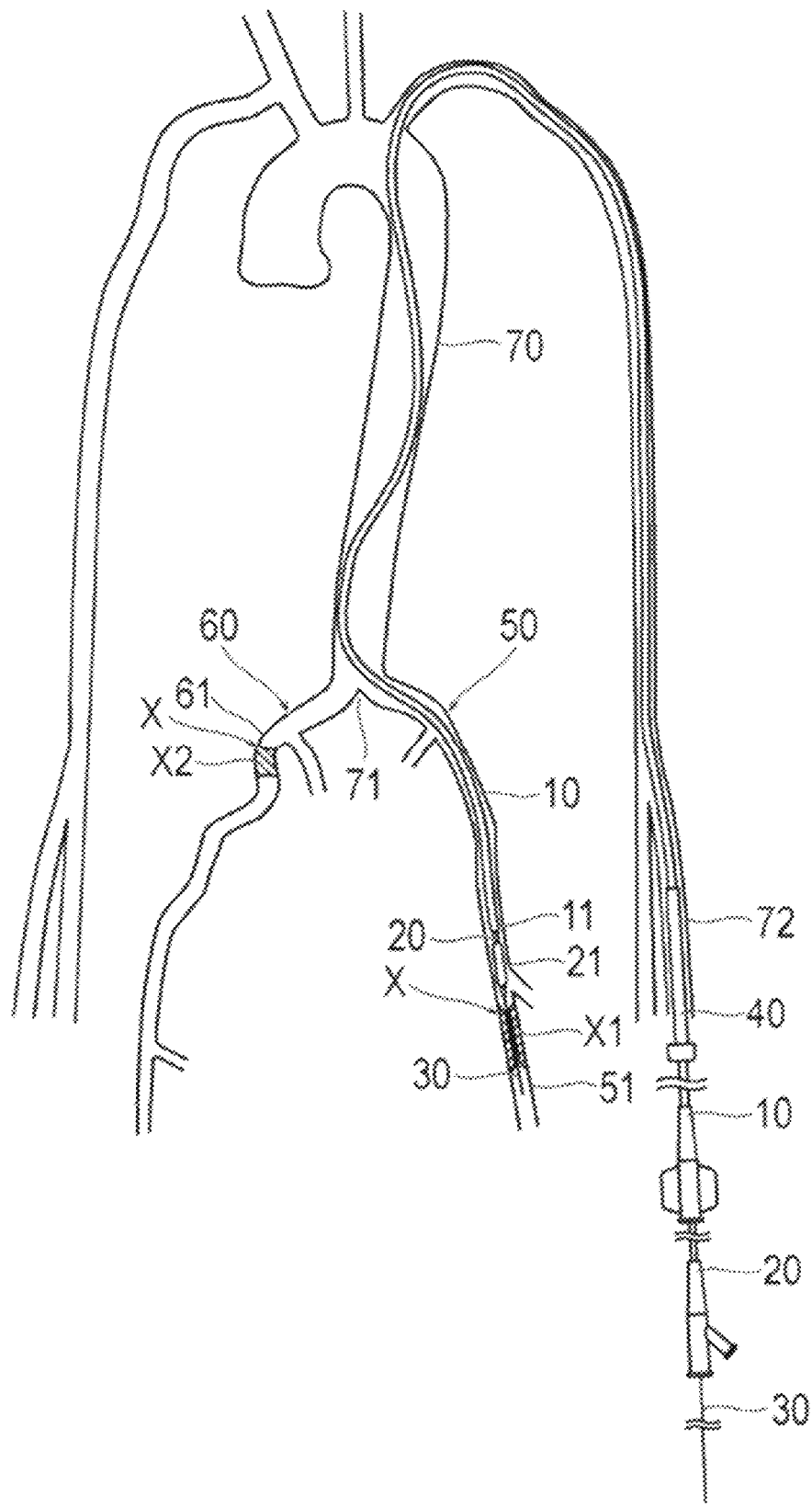
FIG. 1 is a schematic view depicting lesion areas and placement of a guiding catheter in blood vessels.

First, a diagnostic method will be described. Diagnosis refers to physicians examining patients to determine the disease condition(s) of the patient, and the diagnostic method can be performed not only by a person but also by artificial intelligence (hereinafter, referred to as AI), specifically, artificial intelligence obtained by machine-learning. The physician performs diagnosis and treatment as needed from patient information, for example, image information obtained by converting electromagnetic wave information into an image, such as an X-ray contrast image, character information written on a medical record, and information based on a medical interview.

Alternatively, when artificial intelligence supports or performs the diagnosis on the basis of the patient information, the diagnosis is performed using, for example, the image information based on the machine-learning, the diagnosis is verified, and information is provided to the physician to support diagnosis or treatment by the physician or the artificial intelligence performs the diagnosis or treatment.

Alternatively, the diagnosis is supported or performed or the treatment is performed by reinforcement-learning as remuneration for result of treatment.

The diagnostic method is a diagnostic method for determining a lesion area to be treated first of lesion areas in a plurality of bifurcated lumens connected to a biological lumen via a bifurcated portion from a main lumen.

Biological lumens to be treated include gastrointestinal tracts, lymphatic vessels, blood vessels, preferably, blood vessels, and more preferably, arteries.

Particularly preferred is an artery of a lower limb, but may also be a right common iliac artery and the left common iliac artery at an aortailiac bifurcation, and also an external iliac artery and an internal iliac artery bifurcated respectively from the left and right common iliac artery, a common femoral artery extending from the external iliac artery, a superficial femoral artery and a deep femoral artery bifurcated from a femoral artery, or a more peripheral popliteal artery (BTK: below the knee) or an anterior tibial artery, a peroneal artery, a posterior tibial artery, a dorsalis pedis artery, a plantar artery, and other peripheral arteries or even a collateral circulation.

More favorable parts to be treated include the aortailiac bifurcation, the left and right common iliac artery, the external iliac artery and the internal iliac artery, the common femoral artery, the superficial femoral artery, the deep femoral artery, and the popliteal artery (BTK).

The catheter is introduced into an ulnar artery or a radial artery out of the arteries of the arm, but more favorably, into the radial artery (Radial). The radial artery may be of either left or right, but if the distance from the aortailiac bifurcation to the lesion area is large, left TRI, which has an anatomically short distance from a puncture site to the lesion area, is preferred. If the patient's blood vessel is narrow, puncturing from right TRI may be selected through diagnosis for treatment.

Alternatively, if the blood vessel diameter of the lesion area is small, an outer diameter of the catheter to be used is also small. Therefore, the distal radial artery at the distal end of the radial artery (Radial) near the wrist or the radial artery in Snuff box may be punctured and inserted therein with a catheter having a small outer diameter by using an introducer sheath or may be directly punctured.

Here, the radial artery in the Snuff box is a radial artery located on the peripheral side of the radial artery between a short maternal extensor tendon and a long maternal extensor tendon, and is hereinafter referred to as s-RA. The distal radial artery is a dorsal carpal bifurcated portion of the radial artery, is the radial artery located between the long maternal extensor tendon and a tendon of an extensor carpi radialis longus muscle, and is hereinafter referred to as d-RA hereinafter.

In particular, access from Radial or s-RA or d-RA is less invasive, and is preferable because of the shorter hospitalization period. Particularly, if s-RA or d-RA is the left TRI, placing a patient's left wrist on a patient's abdomen is more preferable because the surgeon is allowed to perform treatment while standing on a right side of the patient, which is easier in terms of posture and is less exposed.

In contrast, if TRI is determined as being difficult, or when it is determined that the distance from TRI to the bifurcated portion and lesion area is far, that it takes time, or that there is no reachable device, the access may be selected from a transbrachial artery intervention (TBI) or a transulnar artery intervention.

If the lesion area is hard or is CTO (Chronic Total Occlusion), a retroactive transfemoral artery intervention (TFI), or Bidirectional approach of retroactively puncturing the more peripheral popliteal artery (BTK), the anterior tibial artery, the peroneal artery, the posterior tibial artery, the dorsalis pedis artery, the plantar artery, and other peripheral arteries, or the collateral circulation may be performed simultaneously with Radial access through the diagnosis.

To identify the lesion areas of these biological lumens, the patient information is acquired. The patient information includes electromagnetic wave information about patient's lesion areas, medical record information, non-electromagnetic information such as a distal end load of a guide wire capable of passing through a lesion area, a position of a depth marker of a proximal part of an image diagnosis catheter and the like, nonclinical information such as cost of other devices and labor cost, big data, and the like.

As used herein the term "electromagnetic wave information" is intended to mean, among the patient information, electromagnetic waves detected by irradiating a human body with electromagnetic waves which have been changed due to transmission, absorption, reflection or the like of a medical device or a medicine or the like that has been implanted or inserted into the human body.

Specifically, the patient is irradiated with electromagnetic waves, and electromagnetic waves obtained through the patient are detected, and then electromagnetic wave information about the patient is obtained based on the changed electromagnetic wave. At least one or more lesion areas are identified from the electromagnetic wave information, at least two or more, i.e., plural pieces or plural items of information are extracted from the distance D from the bifurcated portion to the lesion area, the stenosis degree S of the lesion area, the bending degree B of the lesion area, the length L of the lesion area, the blood vessel diameter V of the lesion area and the hardness H of the lesion area of the electromagnetic wave information, and then a first lesion area to be treated first is determined based on the plural pieces of information or plural items of information.

Specifically, the irradiation energy includes X-rays, ultrasounds, infrared rays, visible light, magnetic field lines, and the like, and if it is distant from the human body, an X-ray is preferable, and if it is in contact with or within a human body, ultrasounds and visible light are more preferable. When one or more energies are used, a combination of ultrasounds and near-infrared rays is also applicable.

In a case where X-rays are used as electromagnetic waves, when a contrast agent is injected into the blood vessel and the X-ray is then irradiated, the portion of the body containing a large amount of the contrast agent transmits less amount of X-rays, and therefore the amount of the electromagnetic wave information to be obtained is decreased.

The electromagnetic wave information may be detected by a method of detecting on a plane opposite to an irradiation source with a human body interposed therebetween such as an FPD (flat panel detector), or may be detected over a whole circumference, such as a CT scan.

Usually, formed X-ray image information is used for diagnosis or image classification by machine-learning.

Next, from the image information, it is determined whether or not it is a lesion area. To make such determination, conventional techniques such as Trans-Atlantic Inter-Society Consensus (TASC) II and ABI or a method in conformity with a new guideline described in ESC Guidelines on the Diagnosis and Treatment of Peripheral Arterial Diseases, in collaboration with the European Society for Vascular Surgery (ESVS) (European Heart Journal, Volume 39, Issue 9, 1 Mar. 2018, Pages 763 to 816) may be used.

Based on the detected electromagnetic wave information or the image information obtained by converting the electromagnetic wave information into images, blood vessels of an arm such as an aorta, a radial artery and the like, shapes and positions of arteries of the lower limbs, the distance D from a bifurcated portion of the blood vessel to the lesion area, the stenosis degree S of the lesion area, the bending degree B of the lesion area, the length L of the lesion area, the blood vessel diameter V of the lesion area, the hardness H of the lesion area, and the like can be extracted as the electromagnetic wave information.

Referring to FIG. 1, the distance D that is used as an index of the position of a lesion area X can be expressed as the distance from an aortailiac bifurcation 71 to a proximal end of the lesion area X. The distance D is defined as the length of the blood vessel between the aortailiac bifurcation 71 and the proximal end of the lesion area X. The distance D is, for example 0 to 1000 mm. The definition of the distance D is not limited thereto. For example, as another index for evaluating the position, the blood vessel in which the lesion area X exists is segmented, and a segment in which the lesion area exists may be used as the index. Specifically, as the segment indicative of the position of the blood vessel, the common iliac artery, the external iliac artery, the internal iliac artery, the common femoral artery, the superficial femoral artery, the deep femoral artery, the popliteal artery, the anterior tibial artery, the posterior tibial artery, the peroneal artery, the plantar artery, other bifurcated arteries and the collateral circulation in each of the left and right lower limbs can be used. Alternatively, the determination may be made with a blood vessel name in which a lesion area exists. Alternatively, when an image diagnosis catheter where a depth marker that can be checked with the naked eye is attached to a hand-side is used, the determination may be made using the non-electromagnetic wave information about a position of the depth marker obtained by placing a tip of the image diagnosis catheter at the aortailiac bifurcation and making the tip of the image diagnosis catheter collide with the lesion area.

The stenosis degree S of the lesion area X is defined as the stenosis degree S (%)=((1−MLD/RD)×100), which is calculated from an inner diameter (smallest lumen diameter: MLD) of the smallest lumen diameter of the blood vessel in the lesion site X and an estimated blood vessel diameter (RD) when there is no stenosis in the lesion area X. The stenosis degree S is, for example 0 to 100%, and preferably 60 to 100% in which treatment is required, but is not limited thereto when the determination is made together with the other information. Alternatively, the stenosis degree may be determined on the basis of whether the lesion area is CTO (Chronic Total Occlusion) or whether or not there is blood flow.

The bending degree B of the lesion area X may be calculated by the following method. The center line of the blood vessel is derived by calculating center points of the blood vessel based on the image information about the blood vessel and connecting the center points at a plurality of portions (positions) in the blood vessel with the lesion area X. In the meantime, the "center of blood vessel" means a center of an area surrounded by a vascular wall in a transverse cross-section of a blood vessel. The "bending degree" means the magnitude of bending or curving calculated at each curved or bent portion on the center line of the blood vessel. The "bending degree" may be expressed by using a curvature factor or a radius of curvature. The bending degree B of the lesion area X may be defined as the smallest radius of curvature of the lesion area X. The bending degree B is, for example, 5 to 2000 mm. Alternatively, since the iliac artery is more bent than the femoral artery in many cases, the diagnosis may be performed with the blood vessel name, the information on the position or a combination of the position information and the bending degree.

The length L of the lesion area X is defined as the length from the proximal end of the lesion area X to the distal end of the lesion area X. The length L is, for example, 5 to 400 mm. In a case where the lesion areas intermittently exist, the length of the lesion area may be defined as a length from the most peripheral side end to a proximal end side. Alternatively, each length may be measured using an image diagnosis catheter in the blood vessel.

The blood vessel diameter V of the lesion area X is defined as an estimated intravascular diameter in a case of no lesion area X. The blood vessel diameter V can be estimated by measuring inner diameters of a normal blood vessel at the distal side and the proximal side of the lesion area X and averaging the same, on the basis of the information. The blood vessel diameter V is, for example 0.5 to 12 mm. Alternatively, since the blood vessel has the smaller blood vessel diameter at the peripheral side, the diagnosis may be performed with the blood vessel name, the information about the position or the summed information of the position information and the blood vessel diameter.

The hardness H of the lesion area may be determined in such a way that if chronic total occlusion (CTO) occurs, the proximal side is harder because of being always exposed to the blood flow and the peripheral side is softer than the proximal side because the amount of blood flow is relatively small, and may be determined from the intravascular image information such as IVUS or OCT. Instead of the image, data obtained by direct measurement using a guide wire with a sensor may be used, and a distal end load of the guide wire that can pass through the lesion area at that time may also be used.

For calcification in terms of the hardness H, a CT value (HU: Hans field unit) may be used as a degree of X-ray absorption in a case of using X-ray CT images.

In the CT image, black and white tint values (image density value) assigned to a 2 dimensional image "pixels" or a cube "voxel" are used to represent a CT image. The image density value is referred to as "CT value" in (medical professional) CT, and it is expressed as −1000, which is the lowest value of empty air, as the origin of water at 0. Then, if the air −1000 is set to be black on a CT image, the calcium absorbing a larger amount of X-rays than water and air becomes white. Therefore, the calcification lesion due to calcium deposition has a higher CT value and thus gleams in white with higher brightness. Therefore, this part may be diagnosed as being harder than the black lesion area.

In this embodiment 1, the diagnosis of determining a lesion area to be treated first by using the position (the distance D) and the degree of stenosis S having the highest priority of the image information is performed.

The reason to select the position (the distance D) and the stenosis degree S of the lesion area as the information having the highest priority is to first determine the length of the catheter to be used, particularly, the length of the guide wire and to determine in advance whether an atherectomy catheter is necessary so as to expand the first lesion area.

If the lengths of the catheter and the guide wire are not sufficient, they cannot reach the first lesion area. Also, in CTO and the like, if there is no atherectomy catheter, it is not possible to pass through the occluded site and to secure the blood flow by inflation of a balloon or stent. In addition, it is necessary to stop the procedure and to again perform an operation, and so the left and right lesion areas may not be continuously treated (i.e., may not be treated one after the other).

Alternatively, when both the position (the distance D) and the stenosis degree S satisfy criteria, the diagnosis of determining the lesion area to be treated first is performed. Otherwise, since there is no difference in effects of treatment and in procedure time, the diagnosis of determining that any of the lesion areas is to be treated may be performed.

In a continuous manner, the diagnosis for treating the second lesion area of the other side is performed.

Specifically, from the image information, the information about blood vessels and lesion areas is acquired, and image information about an aortailiac bifurcation, blood vessels of left and right lower limb arteries and lesion areas in each lower limb artery is acquired. If necessary, information about the placement, bifurcated portions, lengths and thicknesses of the blood vessels, and as regards lesion areas, at least two or more, i.e., plural pieces of information from information about the distance D from a bifurcated portion to a lesion area, the stenosis degree S of the lesion area, the bending degree B of the lesion area, the length L of the lesion area, the blood vessel diameter V of the lesion area and the hardness H of the lesion area are acquired.

From the image information, a stenosed site X1 of a left outer superficial femoral artery 51, which is distal to an aortailiac bifurcation 71, i.e., has the large distance D from the bifurcated portion to the lesion area and has a small stenosis degree S, and a CTO occluded site X2 of a right external iliac artery 61, which is proximal to the aortailiac bifurcation 71, i.e., has a small distance D from the bifurcated portion to the lesion area and has a large stenosis degree S, are identified in FIG. 1.

From the image information, the distance D of the stenosed site X1 was 350 mm and the stenosis degree S was 80%, and the distance D of the CTO occluded site X2 was 70 mm and the stenosis degree S was 100%, according to the measurement performed on the screen.

Based on the result, a diagnosis is made to determine that the stenosed site X1 is to be treated first, followed by treatment of the CTO occluded site X2, by applying criterion 1 to the distance D and criterion 2 to the stenosis degree S.

The reason is described: since the distal lesion area X1, which is expected to be difficult to reach because it is necessary to pass through the bent blood vessel, has a small stenosis degree S, if the distal lesion area X1 is reached, it is thought that it is possible to securely complete treatment of the left lower limb artery that can be easily expanded by the balloon.

On the other hand, as regards the CTO occluded site X2 that is close to the aortailiac bifurcation 71 but it is thought to spend or require time for treatment, it is preferred to first penetrate the occluded site with time. If necessary, the atherectomy catheter is used. In a case where it is not possible to use the atherectomy catheter, a treatment scheme of enabling the guide wire to pass by retroactive puncture from the right popliteal artery and penetrating the CTO occluded site X2 by Bidirectional rendezvous technique or the like is designed.

In a case where the left and right order is reversed, if the CTO occluded site X2 is not penetrated or the blood vessel is punctured due to the hard guide wire, the surgeon cannot treat the stenosed site X1 due to the stanching. As a result, both the two lesion areas may not be completely treated, the patient's burden may increase, and the cost of the medical device, the labor cost of the health care worker and the time may be wasted.

The diagnosis may be supported or performed by artificial intelligence, preferably artificial intelligence obtained by machine-learning, more preferably deep learning, and most preferably reinforcement-learning as remuneration for result of treatment.

In the related art, a routine procedure or a speedier procedure is achieved in safety and with certainty by converting implicit knowledge accumulated in the brain, which has been determined by human empirical rule and sense, into explicit knowledge or specific acquisition information that can be transmitted to a third party by paper or an electronic medium.

Although the diagnosis is performed using patient information acquired through diagnosis, the electromagnetic wave information, preferably the image information or the non-image information such as non-electromagnetic wave information, a medical record and a medical interview or a combination thereof may be used.

Alternatively, nonclinical information such as patient's requests such as reducing the duration of hospitalization, and hospital-side requests such as cost and cost-effectiveness to reduce treatment costs or labor costs may be used as the patient information.

Alternatively, when it is not possible to make determination only by the information about the lesion area, the other image information about the patient such as the blood vessel diameters and image information of the left and right radial arteries, the distal end load of the guide wire to be used, the distance to the lesion area that the depth marker of the catheter has reached or the like may be used.

In the meantime, the machine-learning may use image information as in the case of a person, but may use non-image information that cannot be determined by a human eye, if it can be recognized and classified as a feature quantity.

Validation Method

Next, a validation method is described. As used herein the term "validation" is intended to include verifying the truth of a hypothesis by comparing a conclusion derived logically from a hypothesis against an observation on a fact or a result of an experiment.

Specifically, a hypothesis is made such that if the lesion area is determined as being located in each of the left and right lower limb arteries connected via the aortailiac bifurcation, from image information, higher effects of treatment are expected by treating first one lesion area For diagnosis, we will actually perform treatment and match the image information after treatment to ascertain whether the hypothesis is true, taking into account the plural pieces of information about the lesion area and the procedure time.

The validation is preferably performed with image information about the hardness of the lesion area, but it may also be evaluated by other image information about the lesion area such as the thickness of the blood vessel, other image information after the treatment, a degree of improvement of patient's symptoms, long-term prognosis such as existence of patency and existence of restenosis, and a period of time until re-operation.

Embodiment of Validation Method

As an embodiment of the validation method, when determination has changed by changing the information about the hardness of the lesion area, which is a feature quantity, it is estimated that the determination is made by using the corresponding feature quantity.

The ways of changing the information about the hardness include a method of applying noise to electromagnetic wave information. In the method of applying noise, in addition to applying noise to the entire electromagnetic wave information, when noise is applied to one lesion area and different noise is applied to the other lesion area, so that determination changes, it may be estimated that the determination is made depending on information about the noises.

Alternatively, it may be estimated that the determination is made depending on information about the noise when an output does not indicate which one of the lesion areas is to be treated first, but takes a probabilistic form indicating that a value of an output is changed by applying the noise to the output.

In contrast, if no change occurs even though the noise is applied, it is estimated that the corresponding information has no influence. In this case, it may be estimated that the determination is made based on other image information about the lesion area, image information other than the lesion area, or other nonclinical information such as the procedure time, information of the medical record, or a cost of a device.

Alternatively, the validation method may be performed by artificial intelligence, preferably machine-learning, and more preferably reinforcement-learning using a result of treatment.

Treatment Method

A treatment method disclosed here is performed based on at least one of a diagnostic method by a physician, a diagnostic method by machine-learning, a diagnostic method by machine-learning after interpretation based on validation, and a diagnostic method by reinforcement-learning.

As used herein the term "treatment" is intended to include healing of diseases or injuries. However, the treatment may be done by a person, supported by artificial intelligence, or done by artificial intelligence.

According to the treatment method disclosed by way of example here, in order to treat a patient who has lesion areas in both the left and right lower limb arteries, one lesion area is first treated, so that the two lesion areas can be effectively treated by one surgical operation without replacing the guide wire or the other lesion area is treated without removing the catheter. As a result, it is possible to reduce treatment time and thus reduce catheter deterioration and infection risk that may be resulted from removing and reinserting the catheter from and into the body.

Also, when a catheter assembly using the catheter as a guiding catheter and having an inner catheter placed in a lumen is used, the guiding catheter may be relatively easily located near one lesion area where the placement of the catheter is difficult but expansion can be more easily performed.

In addition, treatment time can be shortened by treating the second lesion area using a therapeutic catheter without removing the therapeutic catheter used for previously treating the first lesion area. Also, by treating first the first lesion area that is difficult to be reached and can be easily expanded, the CTO occluded site that can be relatively easily reached even though the surgeon feels fatigued to some extent may be treated efficiently.

In addition, reduction in patient's burden and reduction in medical cost can be achieved by achieving treatment with certainty by efficiently using the catheter while maintaining blood vessel selectivity and capability of passing an occluded site of the guide wire and the catheter to be used for treatment.

As a modification of the embodiment, the guiding catheter may be a sole guiding catheter or a guiding sheath assembly including the guiding catheter and a dilator assembled to each other.

The guiding catheter assembly may prevent kinking of the catheter compared with the sole guiding catheter because the inner catheter reinforces the guiding catheter, and improve passing through the bent lower limb arteries because the inner catheter reduces a clearance between the guiding catheter and the guide wire and thus the level difference with respect to the guide wire is reduced.

The guiding catheter assembly is configured to treat the first lesion area first and then the second lesion area and to thereby continuously treat the left and right lesion areas with one surgical operation by performing operations of inserting the inner catheter into the guiding catheter before introduction, fitting proximal hubs of the respective parts each other before introduction into the arm artery, and removing and replacing the inner catheter with the therapeutic catheter after placement of a catheter tip 11 in the vicinity of the lesion area.

When using the guiding catheter assembly, the therapeutic catheter may be removed once from the guiding catheter, and the inner catheter may be inserted and assembled again and the assembly may be reached to the vicinity of the lesion area, the inner catheter may be removed again, and then the therapeutic catheter may be inserted. Although the procedure time is increased, it is possible to place the catheter tip 11 in the lesion area with safety and with certainty.

Subsequently, treatment methods representing examples of the inventive treatment method are described in detail based on the preferred embodiments. However, the present invention is not limited to the contents of these embodiments disclosed by way of example.

In the description below, a treatment method according to a first embodiment is described with reference to the drawings. For convenience of explanations, the dimensional ratios in the drawings may be different from the actual ratios due to exaggerated illustrations. In the description below, a hand side of the catheter is referred to as "proximal side" and a side to be inserted in the body is referred to as "distal side".

First Embodiment

As shown in FIG. 1, the treatment method of the first embodiment is to continuously treat lesion areas X in both the left and right lower limb arteries by introducing a catheter (a guiding catheter 10, in the first embodiment) from the artery of the patient's arm. The treatment is performed by a therapeutic catheter 20 to be introduced into the artery via the guiding catheter 10.

First, a device to be used for the treatment method is described. The guiding catheter 10 has a lumen through which the therapeutic catheter 20 can pass. Thereby, the guiding catheter 10 provides a passage for guiding the therapeutic catheter 20. At least a part of an outer surface of the guiding catheter 10 is formed with a lubricious coating layer to improve lubricity. Alternatively, the lubricious coating layer may be formed over an entire length, except the hand side part. In the meantime, the catheter may not be the guiding catheter 10 if it has a lumen through which the therapeutic catheter 20 can pass.

The therapeutic catheter 20 is a device for treating the lesion area X. The therapeutic catheter 20 is, for example, a balloon catheter having a balloon 21 as a treatment portion. To treat the lesion area X, the therapeutic catheter 20 may not the balloon catheter. For example, a drug coated balloon, a stent delivery catheter, an atherectomy catheter, an intravascular image diagnosis catheter, or a guide wire support catheter may be used. As the guiding catheter 10 and the therapeutic catheter 20, the well-known catheters may be used.

Figure 2:
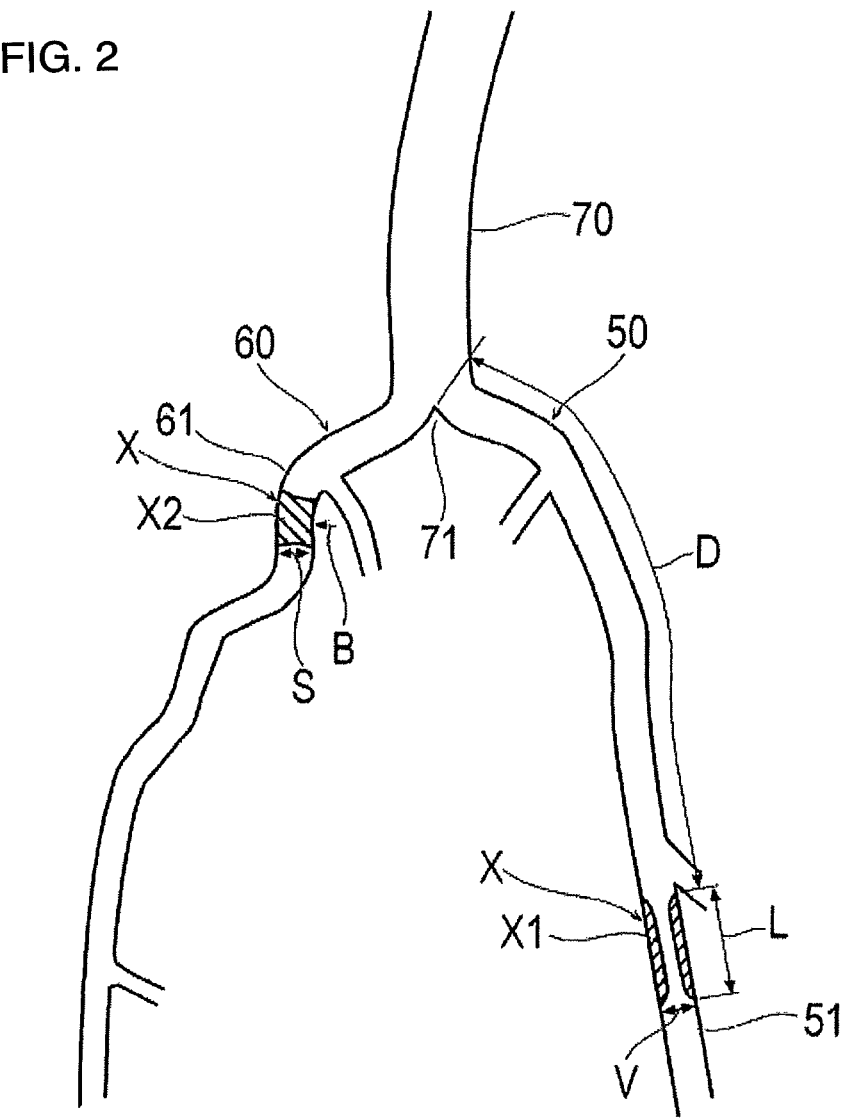
FIG. 2 is an explanatory view depicting the lesion areas in the blood vessels.

Subsequently, the treatment method of the first embodiment is described with reference to flowcharts of FIGS. 3 and 4. Here, as shown in FIG. 2, an example where a left lesion area X1 in a left lower limb artery 50 of the patient and a right lesion area X2 in a right lower limb artery 60 are to be treated is described. The left lesion area X1 is a stenosed site having occurred in a left superficial femoral artery 51 of the left lower limb artery 50. The right lesion area X2 is a CTO occluded site having occurred in a right external iliac artery 61 of the right lower limb artery 60.

First, before an intervention procedure, the patient information is acquired so as to diagnose the patient. However, preferably, the image information about the blood vessel of the patient is obtained (step S10). The image information is not particularly limited but is acquired using angiography by X-rays, CT (Computed Tomography), MRI (Magnetic Resonance Imaging), ultrasound tomography or the like, for example. Alternatively, the image information may be acquired using an image diagnosis catheter such as optical coherence tomography (OCT), optical frequency domain imaging (OFDI) and the like. The information to be obtained from the image information acquired by the diverse image diagnosis devices includes the dimensions and shape of blood vessels, degree of calcification, and existence of blood flow. The surgeon can select and obtain, as comparative information, the information about plural different aspects of each of the lumens, including the distance from an aortailiac bifurcation 71 located below an aorta 70 to the lesion area X, the stenosis degree S, the bending degree B, the length L, and the blood vessel diameter V of the lesion area X, the position of the lesion area X, the number of the lesion areas X and the like, from the patient information (step S11). The comparative information is information for comparing the left lesion area X1 and the right lesion area X2 so as to select a lesion area X to be treated first.

Then, a lesion area X to be treated first is determined (step S12). In order to determine the lesion area X to be treated first, the priority P is set for at least two pieces of comparative information or items of comparative information, as shown in Table 1 (step S21) below. In the first embodiment, the priority P is set for the six comparative information, for example. The comparative information having the smaller numerical value of the priority P has the higher priority P and is preferentially used. The priority P is preferably determined in advance before a procedure. However, the present invention is not limited thereto. At least the two pieces of comparative information (two, in the first embodiment) has the highest priority (P=1). That is, in the first embodiment, there are plural pieces of comparative information having the highest priority (P=1). In the first embodiment, the comparative information having the highest priority (P=1) includes the position D and the stenosis degree S. One or more pieces of comparative information with a numerical value of priority P of 2 or larger are preferably provided.

Each piece of comparative information has criteria (criterion 1 and criterion 2). When determining which one of the left lesion area X1 and the right lesion area X2 is to be treated first, data of the comparative information about the left lesion area X1 and the right lesion area X2 is compared. One of the left lesion area X1 and the right lesion area X2, which satisfies the criteria, is determined as a lesion area to be treated first. As the criteria of each of the comparative information, the criterion 1 and the criterion 2 may be adopted. Different effects are achieved, depending on which of the criterion 1 and the criterion 2 is to be adopted for each of the comparative information. Adopting which of the criterion 1 and the criterion 2 is preferably preset before a procedure. However, the present invention is not limited thereto. That is, it may be set by a surgeon or may be determined by statistical processing using clinical data.

TABLE 1

| Comparative information | Priority P | Criterion 1 | Criterion 2 |
| --- | --- | --- | --- |
| Position (distance D) | 1 | Far | Near |
| Stenosis degree S | 1 | Large | Small |
| Bending degree B | 2 | Large | Small |
| Length L | 3 | Long | Short |
| Vessel diameter V | 4 | Large | Small |
| Hardness H | 5 | Hard | Soft |

For example, in a case where the lesion area X to be treated first is determined using the position, when the criterion 1 is adopted, a positionally distal lesion area is determined as the lesion area X to be treated first. In this case, the distal lesion area is treated first, so that it is possible to securely treat the distal lesion area X, which is thought that it is difficult to first reach the same, by using the guiding catheter 10 before deterioration such as bending of the guiding catheter or peeling-off of the lubricious coating layer occurs. Even if the guiding catheter 10 is deteriorated, the lesion area X to be treated later is positionally proximal (positionally less far way that the lesion area to be treated first). For this reason, it is possible to easily place the guiding catheter 10. Therefore, it is possible to efficiently treat the two lesion areas X by one procedure.

In a case where the lesion area X to be treated first is determined using the position, when the criterion 2 is adopted, a positionally proximal lesion area X is determined as the lesion area X to be treated first. In this case, when treating the proximal lesion area X first, it is possible to reduce the deterioration such as bending of the guiding catheter 10 or peeling-off of the lubricious coating layer. For this reason, after treating the positionally proximal lesion area X, it is possible to favorably treat the lesion area X to be treated later by using the less deteriorated guiding catheter 10.

In a case where the lesion area X to be treated first is determined using the stenosis degree S, when the criterion 1 is adopted, a lesion area of which the stenosis degree S is larger is determined as the lesion area X to be treated first. In this case, the lesion area X of which the stenosis degree S is larger and in which the blood flow is worse is treated first, so that it is possible to improve the blood flow more rapidly.

In a case where the lesion area X to be treated first is determined using the stenosis degree S, when the criterion 2 is adopted, a lesion area of which the stenosis degree S is smaller is determined as the lesion area X to be treated first. In this case, since the lesion area X of which the stenosis degree S is smaller is treated first, it is possible to reduce the deterioration such as bending of the guiding catheter 10 or peeling-off of the lubricious coating layer. For this reason, after treating the lesion area X of which the stenosis degree S is smaller, it is possible to favorably treat the lesion area X to be treated later by using the less deteriorated guiding catheter 10.

In a case where the lesion area X to be treated first is determined using the bending degree B, when the criterion 1 is adopted, a lesion area of which the bending degree B is larger is determined as the lesion area X to be treated first. In this case, the lesion area X of which the bending degree B is larger is treated first, so that it is possible to securely treat the lesion area X having a larger bending degree B, which is thought that it is difficult to first treat the same, by using the guiding catheter 10 before deterioration such as bending of the guiding catheter or peeling-off of the lubricious coating layer occurs. Even if the guiding catheter 10 is deteriorated, the lesion area X to be treated later has a smaller bending degree B. For this reason, it is possible to easily place the guiding catheter 10. Therefore, it is possible to efficiently treat the two lesion areas X by one procedure.

In a case where the lesion area X to be treated first is determined using the bending degree B, when the criterion 2 is adopted, a lesion area of which the bending degree B is smaller is determined as the lesion area X to be treated first. In this case, since the lesion area X of which the bending degree B is smaller is treated first, it is possible to reduce the deterioration of the guiding catheter 10. For this reason, after treating the lesion area X of which the bending degree B is smaller, it is possible to favorably treat the lesion area X to be treated later by using the guiding catheter 10 less deteriorated.

In a case where the lesion area X to be treated first is determined using the length L, when the criterion 1 is adopted, a lesion area of which the length L is longer is determined as the lesion area X to be treated first. In this case, the lesion area X of which the length L is longer is treated first, so that it is possible to first treat the lesion area X in which the blood flow is worse and to thereby improve the blood flow more rapidly.

In a case where the lesion area X to be treated first is determined using the length L, when the criterion 2 is adopted, a lesion area of which the length L is shorter is determined as the lesion area X to be treated first. In this case, since the lesion area X of which the length L is shorter is treated first, the balloon 21 of the therapeutic catheter 20 to be inserted in the guiding catheter 10 is shortened. For this reason, a period of time for which the balloon 21 after inflation of which a frictional resistance against the guiding catheter 10 is high is moved in the guiding catheter 10 is shortened. Therefore, it is possible to smoothly start treatment of the lesion area X to be treated later.

In a case where the lesion area X to be treated first is determined using the blood vessel diameter V, when the criterion 1 is adopted, a lesion area of which the blood vessel diameter V is larger is determined as the lesion area X to be treated first. Alternatively, it may be determined that the blood vessel diameter V of the external iliac artery is larger than the superficial femoral artery. In this case, the lesion area X of which the blood vessel diameter V is larger is treated first, so that it is possible to first treat the lesion area X for which it is possible to achieve effects such as symptomatic recovery of limb ischemia and reduction in burden on the whole body of the patient.

In a case where the lesion area X to be treated first is determined using the blood vessel diameter V, when the criterion 2 is adopted, a lesion area of which the blood vessel diameter V is smaller is determined as the lesion area X to be treated first. In this case, since the lesion area X of which the blood vessel diameter V is smaller is treated first, the balloon 21, which is a treatment portion of the therapeutic catheter 20 to be inserted in the guiding catheter 10, becomes small. For this reason, a period of time for which the balloon 21 after inflation of which a frictional resistance against the guiding catheter 10 is high is moved in the guiding catheter 10 is shortened. Therefore, it is possible to smoothly start treatment of the lesion area X to be treated later of which the blood vessel diameter is larger.

In a case where the lesion area X to be treated first is determined using the hardness H, when the criterion 1 is adopted, a hard lesion area is determined as the lesion area X to be treated first. In this case, the lesion area X having the higher hardness H, i.e., the hard lesion area X such as the CTO occluded site is treated first, so that it is possible to first treat the lesion area X for which it is possible to achieve effects such as symptomatic recovery of limb ischemia and reduction in burden on the whole body of the patient.

In a case where the lesion area X to be treated first is determined using the hardness H, when the criterion 2 is adopted, a lesion area having the lower hardness H, i.e., a soft lesion area is determined as the lesion area X to be treated first. In this case, the soft lesion area X is treated first, so that the inflation is completed easily and in a short time. Therefore, while spending time for treatment of the lesion area of C or D level of TASC II, which is susceptible to puncture at the blood vessel, such as CTO and calcification lesion, it is possible to smoothly start treatment of the lesion area X to be treated later with certainty and safely.

In the first embodiment, in order to determine the lesion area X to be treated first, plural pieces or items of comparative information having the highest priority P are first selected (step S22). In the first embodiment, the plural pieces of comparative information are the position and the stenosis degree S of which the priority P is 1. Therefore, the surgeon first compares the positions and the degrees of stenosis S of the left lesion area X1 and the right lesion area X2 (step S23). Since the criterion 1 is adopted, the surgeon determines whether any one of the left lesion area X1 and the right lesion area X2 satisfies the criteria 1 for both the position and the stenosis degree S (step S24). That is, the surgeon determines whether any one of the left lesion area X1 and the right lesion area X2 is positionally distal and has a larger stenosis degree S. When there is the lesion area X that is positionally distal and has a larger stenosis degree S, the surgeon determines the corresponding lesion area X (i.e., the lesion area that is positionally distal and has a larger stenosis degree S), as the lesion area X to be treated first (step S25).

When both the left lesion area X1 and the right lesion area X2 do not satisfy the criteria 1 for both the position and the stenosis degree S, the surgeon determines whether there is a lesion area X that satisfies the criterion 1 for one of the position and the stenosis degree S and for which the criterion 1 for the other cannot be determined (step S26). The case where it is not possible to determine the criterion 1 for the position may include a case where the distances D of the left lesion area X1 and the right lesion area X2 are substantially the same, for example. The condition that the distances D are substantially the same may include a case where the two distances D are within a preset deviation range, for example. The deviation range in which it is determined that the two distances D are substantially the same is, for example, ±5 to 50 mm, and preferably ±10 mm. Also, when making determination by the segments of position, the case where it is not possible to determine the criterion 1 may include a case where the left lesion area X1 and the right lesion area X2 are located in the same segment, for example, in the superficial femoral artery, and a case where the left lesion area X1 and the right lesion area X2 are located between the proximal end and a center from the distal end of the superficial femoral artery or between the center and the distal end, for example. The case where it is not possible to determine the criterion 1 for the stenosis degree S may include a case where the degrees of stenosis S of the left lesion area X1 and the right lesion area X2 are substantially the same, for example. The condition that it is determined that the degrees of stenosis S are substantially the same may include a case where the two stenosis degrees S are within a preset deviation range, for example. The deviation range in which it is determined that the two stenosis degrees S are substantially the same is, for example, ±10%.

Therefore, when it is not possible to determine the criterion 1 for the position, the surgeon determines the lesion area X that satisfies the criterion 1 for the stenosis degree S, as the lesion area X to be treated first. Alternatively, when it is not possible to determine the criterion 1 for the stenosis degree S, the surgeon determines the lesion area X that satisfies the criterion 1 for the position, as the lesion area X to be treated first.

When the lesion areas X that satisfy the criteria 1 for the position and the stenosis degree S are different, or when it is not possible to determine the lesion area X that satisfies the criteria 1 for both the position and the stenosis degree S, the surgeon selects the comparative information (the bending degree B) having the lower priority (P=2) (step S27). Then, the surgeon determines whether any one of the left lesion area X1 and the right lesion area X2 satisfies the criterion 1 for the selected comparative information (the bending degree B) (step S28). That is, the surgeon determines whether any one of the left lesion area X1 and the right lesion area X2 has a larger bending degree B. When there is the lesion area X having a larger bending degree B, the surgeon determines the corresponding lesion area X, as the lesion area X to be treated first (step S25).

In the first embodiment shown in FIG. 2, the lesion areas X that satisfy the criteria 1 for the position and the stenosis degree S are different. That is, the left lesion area X1 satisfies the criterion 1 for the position. The stenosis degree S (for example, 100%) of the right lesion area X2 is larger than the stenosis degree S (for example, 70%) of the left lesion area X1. Therefore, the left lesion area X2 does not satisfy the criterion 1 for the stenosis degree S. For this reason, there is no lesion area X that satisfies the criteria 1 for both the position and the stenosis degree S. Therefore, the surgeon determines that there is no lesion area X satisfying the criteria 1 for the plural pieces of comparative information (the position and the stenosis degree S) of which the priority P is 1. Then, the surgeon determines whether any one of the left lesion area X1 and the right lesion area X2 satisfies the criterion 1 for the comparative information (the bending degree B) having a next (lower) priority (P=2) (step S28). When there is the lesion area X having a larger bending degree B, the surgeon determines the corresponding lesion area X as the lesion area X to be treated first (step S25).

Then, when it is not possible to determine the lesion area X that satisfies the criterion 1 for the comparative information (the bending degree B), the surgeon selects the comparative information having a lower priority (step S27). The surgeon can repeat steps S27 and S28 by sequentially using the comparative information from the comparative information having the upper or higher priority P. The surgeon can repeat steps S27 and S28 while changing the comparative information until the lesion area X to be treated first is to be determined.

In the meantime, the deviation range in which it is determined that the two bending degrees B are substantially the same is, for example, ±5 to 100 mm, and preferably ±10 mm. The deviation range in which it is determined that the two lengths L are substantially the same is, for example, ±1 to 100 mm, preferably ±5 to 25 mm, and more preferably ±10 mm. The deviation range in which it is determined that the two blood vessel diameters V are substantially the same is, for example, ±0.1 to 2 mm, and preferably ±0.5 mm. The deviation range in which it is determined that the hardness H of the two lesion areas is substantially the same is, for example, 10 to 100 HU, and preferably ±20 HU.

After determining the lesion area X to be treated first, the surgeon proceeds to a procedure using the guiding catheter 10 and the therapeutic catheter 20. Here, it is described that the left lesion area X1 has been determined as the lesion area X to be treated first.

As shown in FIG. 1, the surgeon punctures a left radial artery 72, for example, by a puncturing needle (not shown), and places a mini guide wire (not shown) in the blood vessel. Then, the surgeon introduces a sheath introducer 40 having a dilator (not shown) inserted therein into the blood vessel along the mini guide wire. Then, the surgeon removes the dilator and the mini guide wire. Subsequently, the surgeon introduces the guiding catheter 10 having a guide wire 30 inserted therein into the blood vessel via the sheath introducer 40.

Figure 5:
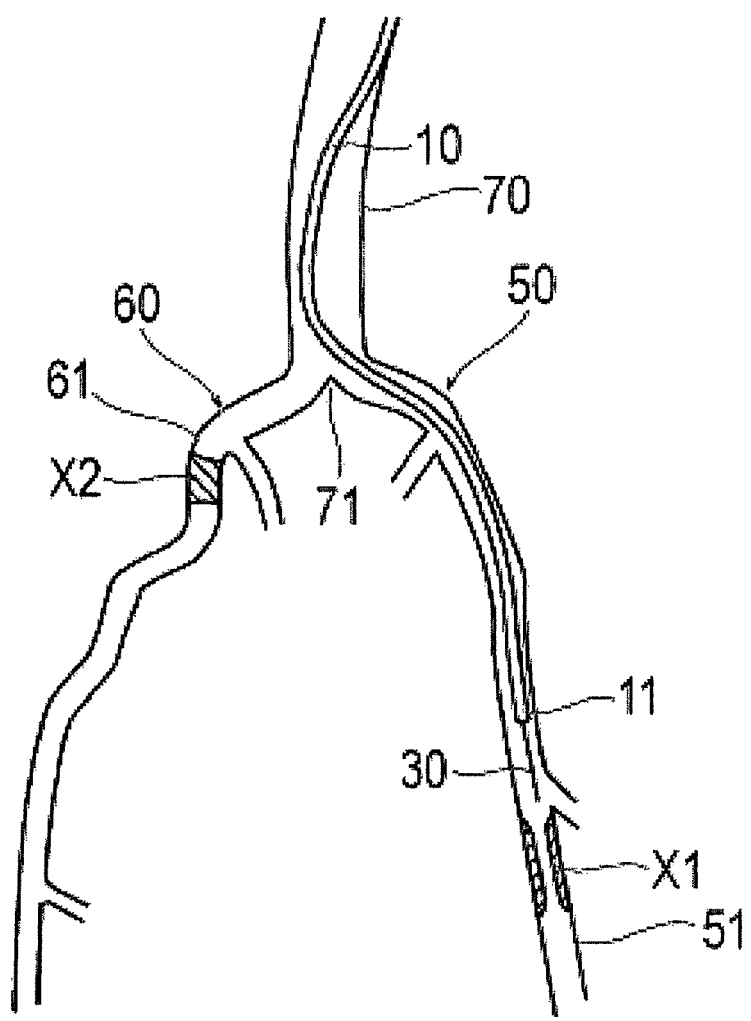
FIG. 5 is an explanatory view depicting a state where the guiding catheter is introduced into a left lower limb artery.

Subsequently, as shown in FIG. 5, the surgeon pushes and advances the guiding catheter 10 at least into the aorta 70 of the patient along the guide wire 30 (step S13). Specifically, the surgeon places the catheter tip 11 of the guiding catheter 10 in the vicinity of the left lesion area X1 in the left superficial femoral artery of the left lower limb artery 50, beyond the aortailiac bifurcation 71. Then, the surgeon places the guide wire 30 at a position beyond the left lesion area X1.

Figure 6:
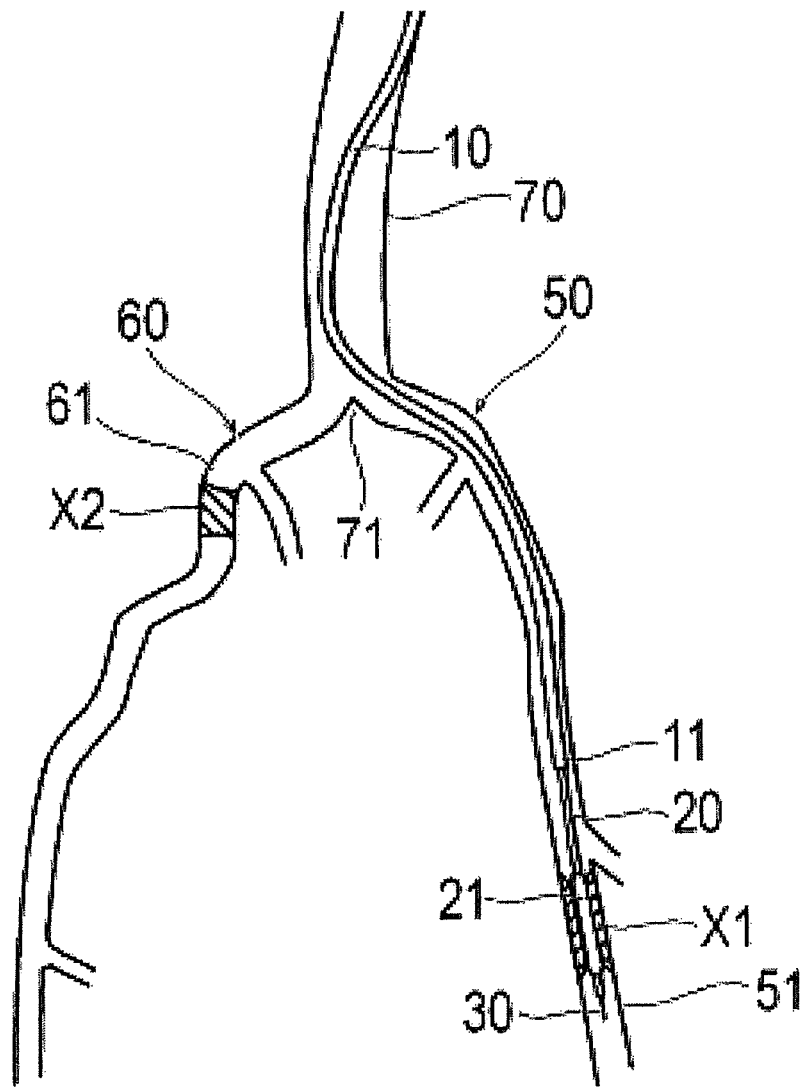
FIG. 6 is an explanatory view depicting a state where a lesion area in the left lower limb artery is treated.

Then, as shown in FIG. 1, the surgeon inserts the proximal end of the guide wire 30 into the guide wire lumen of the therapeutic catheter 20, and then into the guiding catheter 10. Then, the surgeon projects the therapeutic catheter 20 from an opening of the catheter tip 11. Subsequently, as shown in FIG. 6, the surgeon pushes and advances the therapeutic catheter 20 along the guide wire 30. Thereby, the balloon 21 that is the treatment portion is placed in the left lesion area X1.

Figure 7:
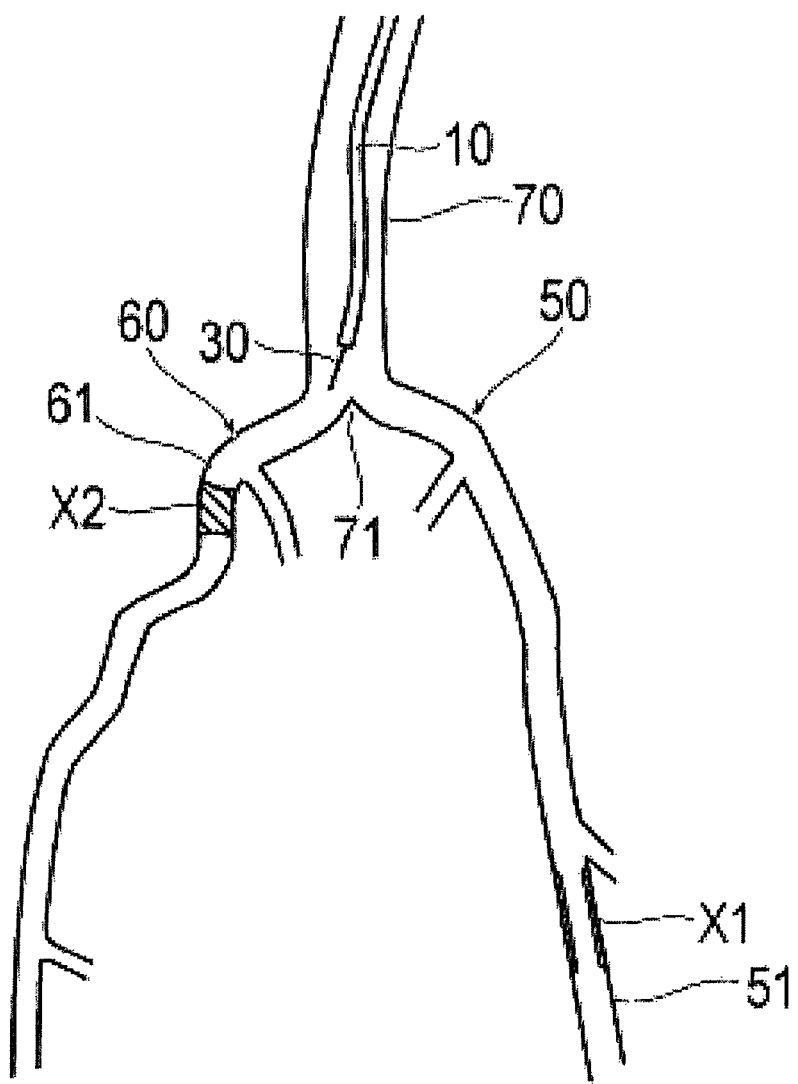
FIG. 7 is an explanatory view depicting a state where the guiding catheter is retracted to an aorta.

Subsequently, the surgeon attaches an inflator (not shown) to a hub of the therapeutic catheter 20, and injects liquid therein. Thereby, the balloon 21 is inflated to push and expand the left stenosed site X1 (step S14). Then, the surgeon operates the inflator to remove the liquid, thereby deflating the balloon 21. Then, the surgeon retracts the balloon 21 from the left lesion area X1 to the proximal side. The guide wire 30 is also retracted to the hand-side. Subsequently, as shown in FIG. 7, the surgeon retracts the guiding catheter 10 to the aorta 70 at the proximal side to the aortailiac bifurcation 71.

Figure 8:
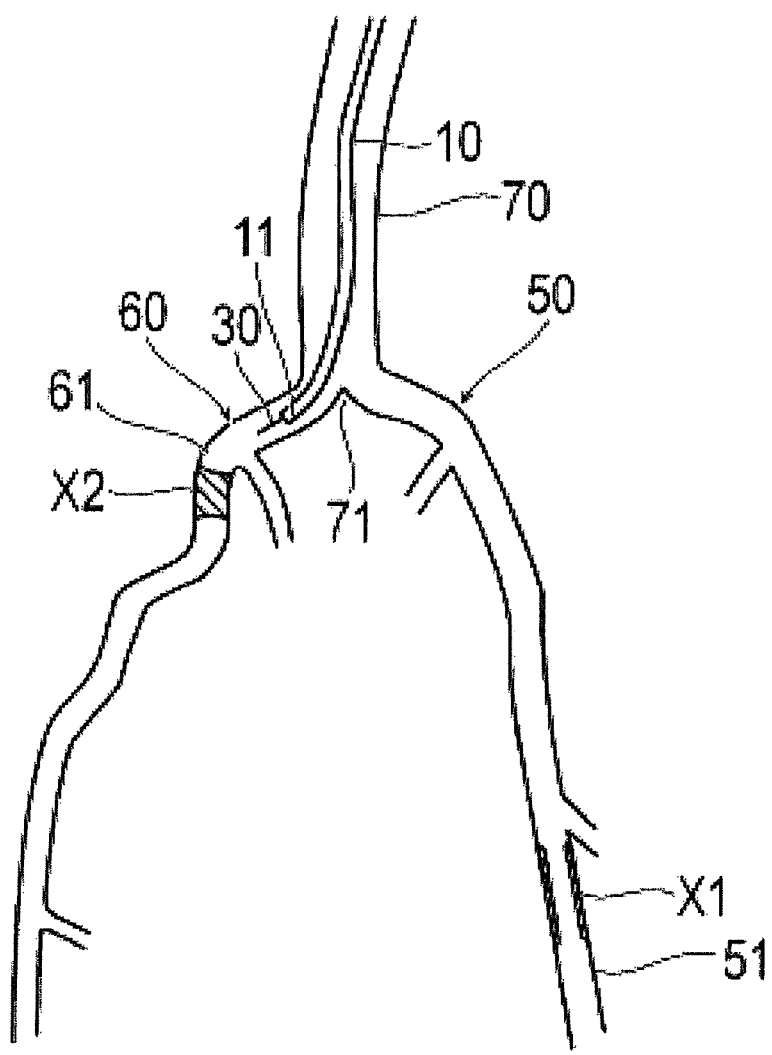
FIG. 8 is an explanatory view depicting a state where the guiding catheter is introduced in a right lower limb artery.
Figure 9:
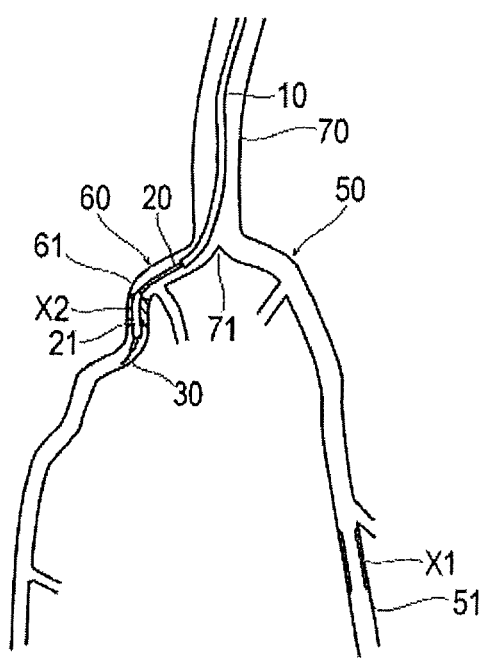
FIG. 9 is an explanatory view depicting a state where a lesion area in the right lower limb artery is treated.

Subsequently, the right lesion area X2 determined as being treated later is treated. The guiding catheter 10 has been already subjected to the treatment of the left lesion area X1 through the bent left lower limb artery 50. For this reason, the guiding catheter 10 may remain bent or the lubricious coating layer thereof may be peeled off. However, the right lesion area X2 is close to the aortailiac bifurcation 71. For this reason, as shown in FIG. 8, it is possible to place the catheter tip 11 of the guiding catheter 10 in the vicinity of the right lesion area X2 of the right external iliac artery 61 beyond the aortailiac bifurcation 71. As an alternative, the catheter tip 11 may be placed in the aorta 70 without being located beyond the aortailiac bifurcation 71. Subsequently, the surgeon places the guide wire 30 at a position beyond the right lesion area X2. Then, the surgeon pushes and advances the therapeutic catheter 20 along the guide wire 30, and places the balloon 21 in the right lesion area X2, as shown in FIG. 9.

Then, the surgeon injects the liquid into a balloon catheter from the inflator. Thereby, the balloon 21 is inflated to push and expand the right lesion area X2 (step S15). Then, the surgeon operates the inflator to deflate the balloon 21.

Thereafter, the surgeon retracts the therapeutic catheter 20, the guiding catheter 10, and the guide wire 30 to the proximal side or in the proximal direction, and removes the same from the body. Thereby, the treatment of the left lesion area X1 and the right lesion area X2 is over or completed.

In the first embodiment, the left lesion area X1 and the right lesion area X2 are treated by using one therapeutic catheter 20 in a state where the guiding catheter 10 is placed in the blood vessel. However, in a case where the therapeutic catheter 20 is a balloon catheter, the therapeutic catheter 20 may be used for treatment of the right lesion area X2 without being removed or the therapeutic catheter 20 may be removed after treating the left lesion area X1. The removed therapeutic catheter 20 is re-inserted after being cleaned. Alternatively, the therapeutic catheter 20 may be replaced with a new one after the treatment of the left lesion area X1. In this case, since the guiding catheter 10 is remained in the blood vessel, the therapeutic catheter 20 can be easily replaced.

In particular, when the therapeutic catheter 20 is a stent delivery catheter or a drug coated balloon, the function thereof is diminished by one treatment. In this case, therefore, the therapeutic catheter 20 should be replaced.

As described above, the treatment method according to the first embodiment is a method of treating a patient having the lesion areas X in both the left and right lower limb arteries, and includes step S11 of selecting, from the patient information, at least the two pieces of information to be selected from the position of each lesion area X relative to at least the aortailiac bifurcation 71, the stenosis degree S of each lesion area X, the bending degree B of each lesion area X, the length L of each lesion area X, and the blood vessel diameter V of each lesion area X, as the comparative information for comparison; step S12 of determining the lesion area X to be treated first, based on at least the two pieces of selected comparative information about each of the lesion areas X; step S13 of introducing the guiding catheter 10 from the artery of the arm of the patient, advancing and placing the distal part of the guiding catheter 10 at least into the aorta 70 of the patient; step S14 of inserting the therapeutic catheter 20 into the lumen of the guiding catheter 10 placed, projecting the therapeutic catheter 20 from the distal part of the guiding catheter 10, and treating first the lesion area X determined as being treated first by the therapeutic catheter 20, and step S15 of treating the other lesion area X.

According to the treatment method configured as described above, the lesion area X to be treated first is determined using at least the two pieces of comparative information. Therefore, as compared to a configuration where one comparative information is used, it is possible to select reasonably and effectively a favorable order of treatments capable of achieving the desired effects.

In particular, as the guiding catheter 10 passes over the long distance from the arm to the lower limb artery, the guiding catheter may be bent or the lubricious coating layer on the surface thereof may be peeled off. When the guiding catheter 10 is unexpectedly bent, it is difficult to place the guiding catheter 10 as expected. If the guiding catheter 10 is not placed as expected, it may influence the pushing-in of the therapeutic catheter 20. Also, if the lubricious coating layer is peeled off, it is difficult for the guiding catheter to pass through the stenosed site or bent portion of the blood vessel. Therefore, the operability of the treatment method using the guiding catheter 10 is lowered, the treatment effects are lowered, and the time to reach the lesion area X increases, so that the patient's burden increases and the medical economics are lowered.

In contrast, according to the treatment method of the first embodiment, it is possible to obtain the surgeon's desired effects to the maximum by using at least the two pieces of comparative information. Therefore, according to the treatment method of the first embodiment, it is possible to improve the operability and the treatment effects, to shorten the time to reach the lesion area X, to reduce the patient's burden, and to increase the medical economics.

Also, in step S22 of selecting at least the two pieces of information, as the comparative information, the information about at least the position and the stenosis degree S may be selected. Thereby, the treatment method of the first embodiment can effectively determine the lesion area X to be treated first by using the position and the stenosis degree S, which are factors highly relating to the influences on the difficulty level of the procedure and the biological body.

Also, the treatment method of the first embodiment further includes step S21 of setting the priority P, which is to be used so as to determine the lesion area X to be treated first, for each of the comparative information, and step S12 of determining the lesion area X to be treated first includes steps S24, 26 of determining whether or not to determine the lesion area X to be treated first, based on at least the two pieces of comparative information having the highest priority P, and step S25 of, when it is determined that the lesion area X to be treated first is to be determined, determining the lesion area X to be treated first on the basis of the comparative information. Thereby, since the treatment method of the first embodiment determines whether or not to determine the lesion area X to be treated first on the basis of at least the two pieces of comparative information having the highest priority P, it is possible to determine reasonably and effectively the lesion area X to be treated first so as to achieve the favorable effects.

Also, step S12 of determining the lesion area X to be treated first further includes step S28 of, when it is determined in step S26 of determining whether or not to determine the lesion area X to be treated first that the lesion area X to be treated first is not to be determined, determining whether or not to determine the lesion area X to be treated first on the basis of the comparative information having a next priority P. Thereby, according to the treatment method of the first embodiment, when it is not possible to determine the lesion area X, it is possible to determine reasonably and effectively the lesion area X to be treated first so as to achieve the favorable effects while increasing the comparative information with stepwise lowering the priority P.

In the meantime, the priority P of the comparative information is not limited to the example of Table 1. For example, the comparative information having the highest priority (P=1) may be set as the position and the stenosis degree S, and the criterion 1 for the position and the criterion 2 for the stenosis degree S may be adopted. When performing treatment from the lesion area X satisfying such condition, it is possible to easily treat the corresponding lesion area because it is positionally distal and has the smaller degree of stenosis S, and to treat the other lesion area X without removing one guiding catheter 10 from the body. Therefore, it is possible to reduce the number of the catheters to be used and to treat both the lesion areas X while saving the cost.

Also, the comparative information having the highest priority (P=1) may be set as the stenosis degree S and the length L, and the criterion 2 for the stenosis degree S and the criterion 2 for the length L may be adopted. When performing treatment from the lesion area X satisfying such condition, it is possible to perform the treatment from the lesion area X that can be easily treated due to the smaller degree of stenosis S and the shorter length L.

Also, the comparative information having the highest priority (P=1) may be set as the stenosis degree S and the blood vessel diameter V, and the criterion 1 for the stenosis degree S and the criterion 1 for the blood vessel diameter V may be adopted. When performing treatment from the lesion area X satisfying such condition, it is possible to perform the treatment from the lesion area X for which it is possible to achieve the high treatment effects due to the large degree of stenosis S and the large blood vessel diameter V.

Also, in the first embodiment, the comparative information having the highest priority (P=1) is two but may be three, four, five or six or more.

Second Embodiment

Figure 3:
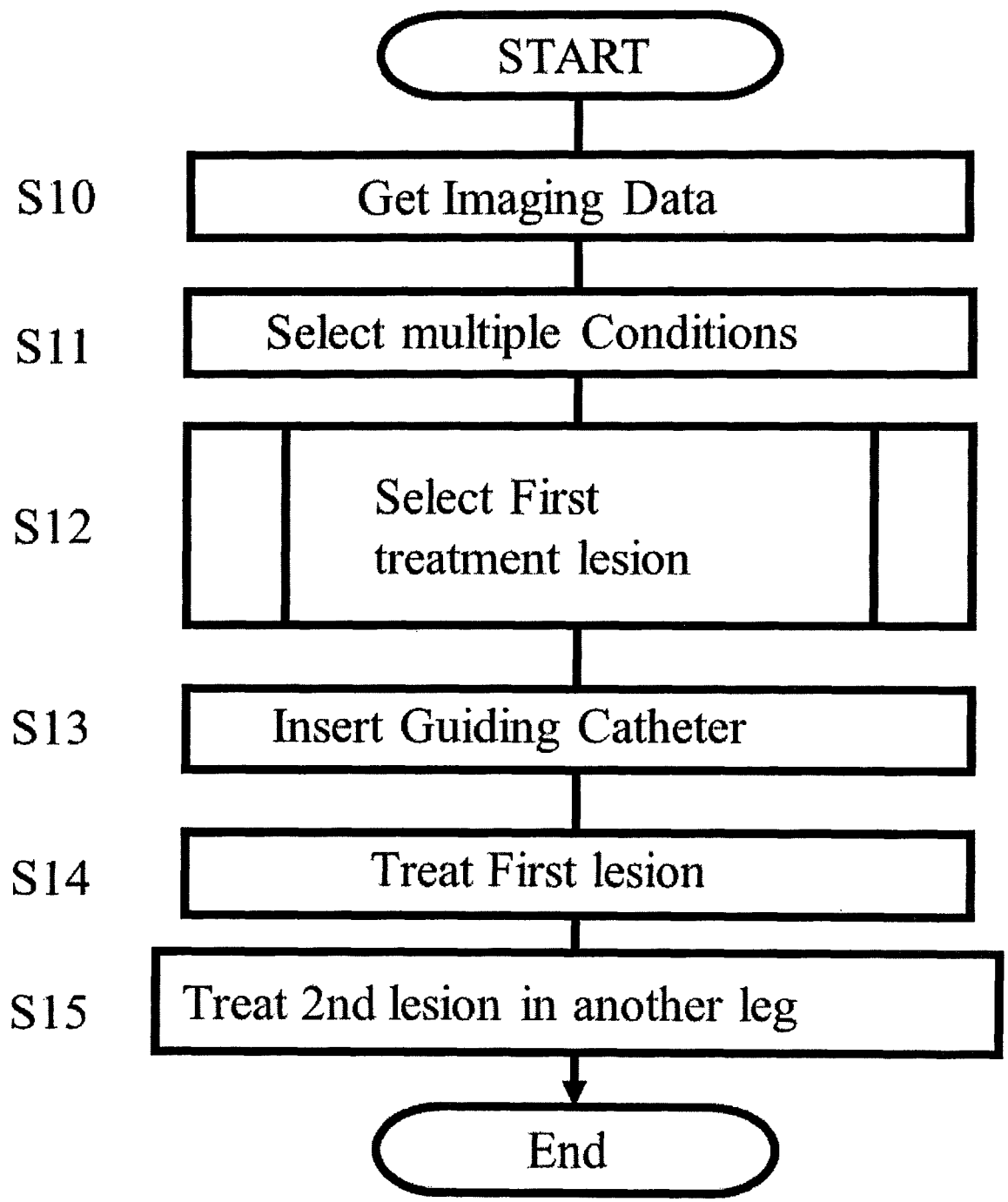
FIG. 3 is a flowchart of a treatment method according to a first embodiment.
Figure 10:
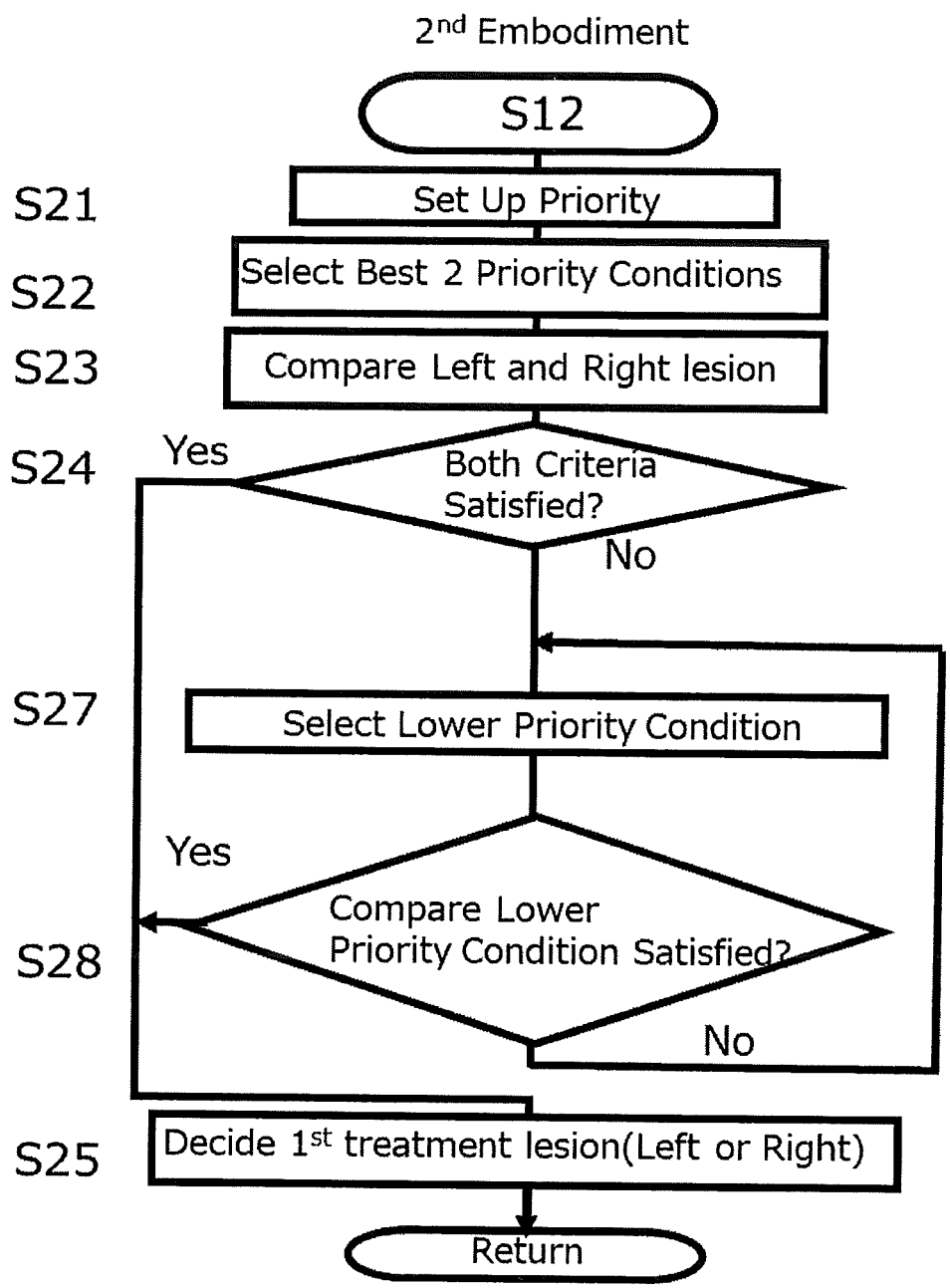
FIG. 10 is a subroutine flowchart of step S12, in which the lesion area to be treated first is to be determined, in a treatment method according to a second embodiment.

A treatment method of a second embodiment is different from the first embodiment, as regard the sequence of determining the lesion area X to be treated first by using the two pieces of comparative information having the highest priority (P=1) (for example, the position and the stenosis degree S), as shown in flowcharts of FIGS. 3 and 10. In the meantime, steps in which the same sequences as the first embodiment are to be performed are denoted with the same reference numerals, and the descriptions of such steps is not repeated.

Figure 4:
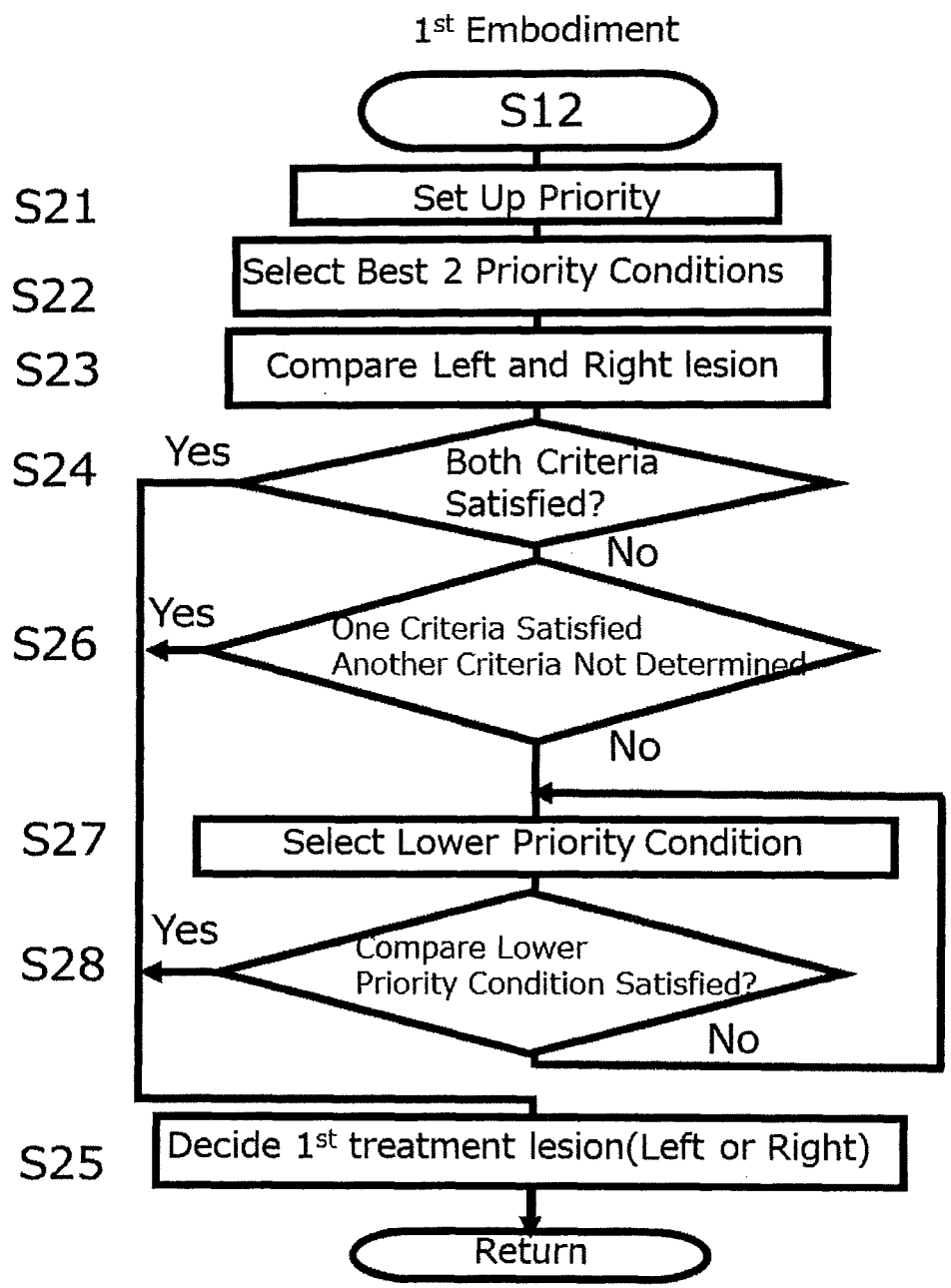
FIG. 4 is a subroutine flowchart of step S12 of FIG. 3 in which a lesion area to be treated first is to be determined.

The treatment method of the second embodiment is different from the treatment method of the first embodiment, in that step S26 of the first embodiment shown in FIG. 4 is not included. That is, as shown in a subroutine flowchart of FIG. 10, according to the treatment method of the second embodiment, only when there is the lesion area X that satisfies the criteria for both the two pieces of comparative information having the highest priority (P=1), the corresponding lesion area X is determined as the lesion area X to be treated first (steps S24, 25). When there is no lesion area X that satisfies the criteria for both the two pieces of comparative information having the highest priority (P=1), the lesion area X to be treated first is not determined only with the two pieces of comparative information. That is, step S26 of the first embodiment is not performed. Then, the surgeon selects the comparative information (for example, the bending degree B) having the lower priority P (step S27), and determines whether there is the lesion area X that satisfies the criterion for the corresponding comparative information (step S28). The surgeon can repeat steps S27 and S28 by sequentially using the comparative information from the comparative information having the upper priority P. In the meantime, the other sequences are the same as the treatment method of the first embodiment.

As described above, according to the treatment method of the second embodiment, when there is the lesion area X that satisfies the criteria for both the two pieces of comparative information having the highest priority (P=1), the corresponding lesion area X is determined as the lesion area X to be treated first (steps S24, 25), and when there is no lesion area X that satisfies the criteria for both the two pieces of comparative information having the highest priority (P=1), it is determined whether there is the lesion area X that satisfies the criterion for the comparative information (for example, the bending degree B) having a next priority P. Thereby, according to the treatment method of the second embodiment, it is strictly determined whether the comparative information satisfies the criteria, so that it is possible to determine reasonably and effectively the lesion area X to be treated first so as to achieve the desired effects.

Third Embodiment

As shown in Table 2, a treatment method of a third embodiment is different from the treatment method of the second embodiment, in that the comparative information having the highest priority (P=1) is only one. In the meantime, steps in which the same sequences as the first and second embodiments are to be performed are denoted with the same reference numerals, and the descriptions thereof are omitted.

TABLE 2

| Comparative information | Priority P | Criterion 1 | Criterion 2 |
| --- | --- | --- | --- |
| Position (distance D) | 1 | Far | Near |
| Stenosis degree S | 2 | Large | Small |
| Bending degree B | 3 | Large | Small |
| Length L | 4 | Long | Short |
| Vessel diameter V | 5 | Large | Small |
| Hardness H | 6 | Hard | Soft |

Figure 11:
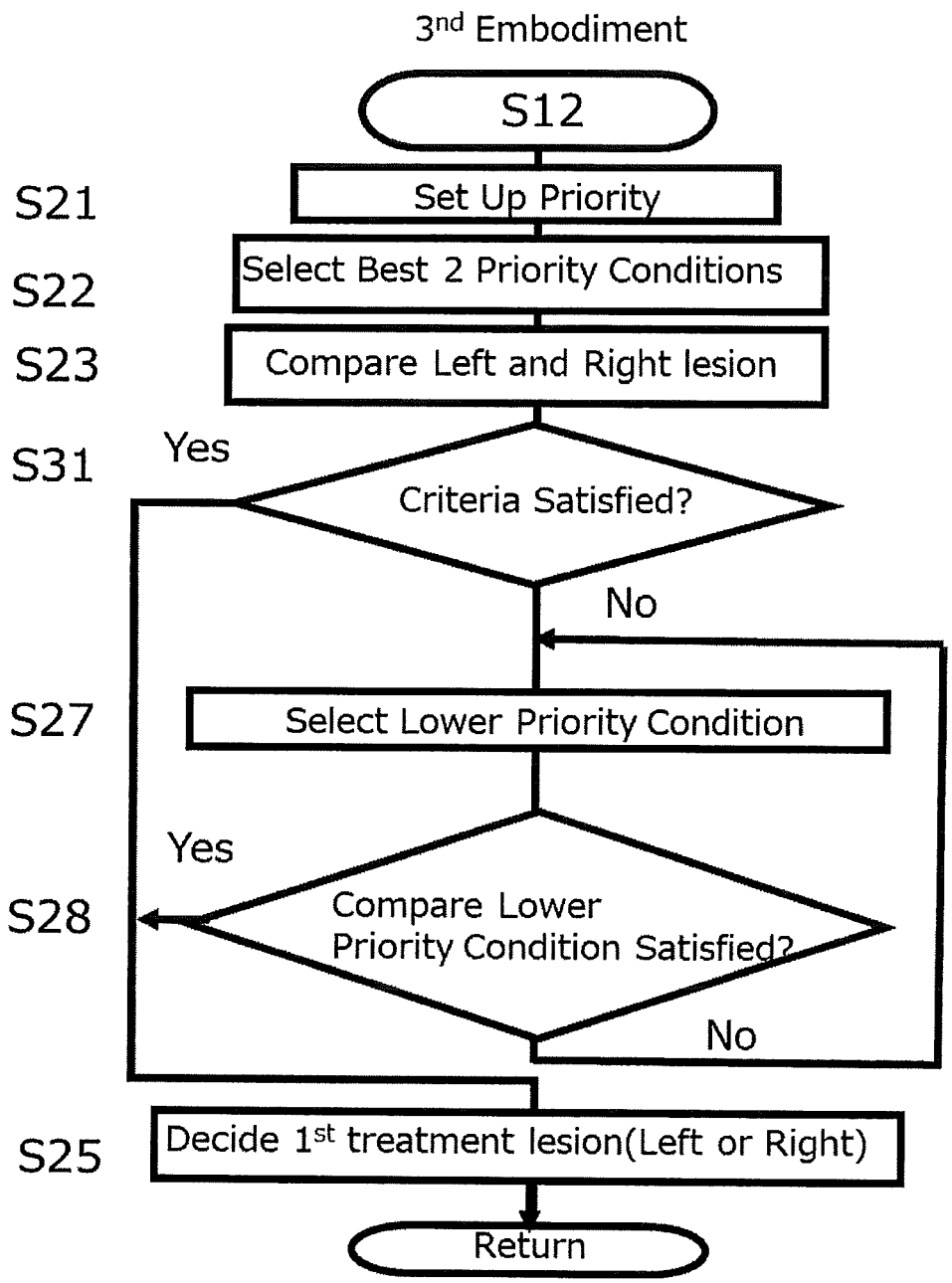
FIG. 11 is a subroutine flowchart of step S12, in which the lesion area to be treated first is to be determined, in a treatment method according to a third embodiment.

Subsequently, the treatment method of the third embodiment is described with reference to flowcharts of FIGS. 3 and 11.

According to the treatment method of the third embodiment, the comparative information (for example, the position) having the highest priority (P=1) is only one. For this reason, the surgeon compares the positions of the left lesion area X1 and the right lesion area X2, in step S12 of determining the lesion area X to be treated (step S23). Since the criteria 1 is adopted, the surgeon determines whether any one of the left lesion area X1 and the right lesion area X2 satisfies the criterion 1 for the position (step S31). When there is the lesion area X that is positionally distal, the surgeon determines the corresponding lesion area X, as the lesion area X to be treated first (step S25). When there is no lesion area X that satisfies the criterion 1 for the position having the highest priority (P=1), the surgeon selects the comparative information (for example, the stenosis degree S) having a next priority (P=2) (step S27), and determines whether there is the lesion area X that satisfies the criterion 1 for the comparative information (step S28). In the meantime, the other sequences are the same as the treatment method of the second embodiment.

As described above, the treatment method of the third embodiment is a method of treating a patient having the lesion areas X in both the left and right lower limb arteries, and includes step S11 of selecting, from the patient information, the information to be selected from the position of each lesion area X relative to the aortailiac bifurcation 71, the stenosis degree S of each lesion area X, the bending degree B of each lesion area X, the length L of each lesion area X, and the blood vessel diameter V of each lesion area X, as the comparative information for comparing the plurality of lesion areas X; step S21 of setting the priority P, which is to be used so as to determine the lesion area X to be treated first, for each of the comparative information; step S31 of determining whether or not to determine the lesion area X to be treated first, based on the comparative information having the highest priority P on each of the plurality of lesion areas X; step S25 of, when it is determined that the lesion area X to be treated first is to be determined, determining the lesion area X to be treated first on the basis of the comparative information, and step S28 of, when it is determined that the lesion area X to be treated first is not to be determined, determining the lesion area X to be treated first by using the comparative information having a next priority P. Thereby, according to the treatment method of the third embodiment, it is possible to determine reasonably and effectively the lesion area X to be treated first so as to achieve the desired effects by sequentially using the comparative information from the comparative information having the higher priority P.

Fourth Embodiment

As shown in Table 3, a treatment method of a fourth embodiment is different from the treatment methods of the first, second and third embodiments, in that the comparative information is only two. In the meantime, steps in which the same sequences as the first, second and third embodiments are to be performed are denoted with the same reference numerals, and the descriptions thereof are omitted.

TABLE 3

| Comparative information | Priority P | Criterion 1 | Criterion 2 |
| --- | --- | --- | --- |
| Position (distance D) | 1 | Far | Near |
| Stenosis degree S | 1 | Small | Large |

Subsequently, the treatment method of the fourth embodiment is described with reference to a flowchart of FIG. 12.

In the treatment method of the fourth embodiment, the comparative information (for example, the position and the degree of stenosis) is only two. For this reason, the surgeon compares the positions and the degrees of stenosis of the left lesion area X1 and the right lesion area X2, in step S12 of determining the lesion area X to be treated (step S23). Since the criteria 1 are adopted, the surgeon determines whether any one of the left lesion area X1 and the right lesion area X2 satisfies the criteria 1 for the position and the degree of stenosis (step S31). When there is the lesion area X that is positionally distal and has the smaller degree of stenosis, the surgeon determines the corresponding lesion area X, as the lesion area X to be treated first (step S25). When there is no lesion area X satisfying the criterion 1, there are no differences in terms of the effects of treatment, the costs and the like, there is no lesion area to be treated first or there is no order of treatments, so that it is determined that any lesion area may be treated first. Based on the determination, the surgeon performs diagnosis and determines an order of treatments.

According to the fourth embodiment, it is possible to find out a feature quantity to influence the determination by surgeon's experience, by statistical analysis through collection and accumulation of data about the number of operations and results of treatments or by machine-learning. As a result, since the other information about the lesion area is not unnecessarily collected, it is possible to reduce the burden on the diagnosticians or the amount of data to be processed and to shorten the time to be spent for diagnosis.

Thereby, according to the treatment method of the fourth embodiment, it is possible to conveniently determine the lesion area X to be treated first reasonably and efficiently so as to achieve the desired effects, from the plural pieces of minimum required comparative information for diagnosis. The comparative information is not limited to the position and the degree of stenosis and may be the other information about the lesion area or the patient information other than the information about the lesion area. Alternatively, the determination may be made by one feature quantity obtained by combining the plural pieces of information about the lesion area or a plurality of feature quantities.

Example 1

An interventional device used in a treatment method included an introducer sheath 12 including a dilator and a hemostasis valve and having an outer diameter of 2.8 mm, an inner diameter of 2.4 mm at a distal end, and an entire length of 130 mm, a guiding catheter 10 having an outer diameter of 2.4 mm, an inner diameter of 2.2 mm, and an entire length of 1550 mm, and a rapid-exchange type balloon catheter 20 having a balloon size of 7 mm in an inflated state, a balloon length of 40 mm, and an entire length of 2000 mm and a guide wire (an entire length of 3800 mm) having an outer diameter of 0.9 mm, as a therapeutic catheter for performing treatment in the stenosed site X1 and the CTO occluded site X2. The maximum length of projection of the balloon catheter 20 from a catheter tip 11 when inserted into the guiding catheter 10 was 400 mm.

The guiding catheter 10 used here was a dual catheter combined with an inner catheter (an outer diameter of 2.1 mm, an inner diameter of 1.1 mm, and an entire length of 1600 mm, not shown). The maximum length of projection was 30 mm.

By using the interventional device, a treatment simulation was performed for a blood vessel model, as described below.

As regards the treatment, the diagnosis of determining that the first lesion area to be treated first was the stenosed site X1 in the left superficial femoral artery 51 and the lesion area to be treated later was the CTO occluded site X2 in the right external iliac artery 61 on the basis of the distance D from the bifurcated portion and the stenosis degree S was performed.

Figure 12:
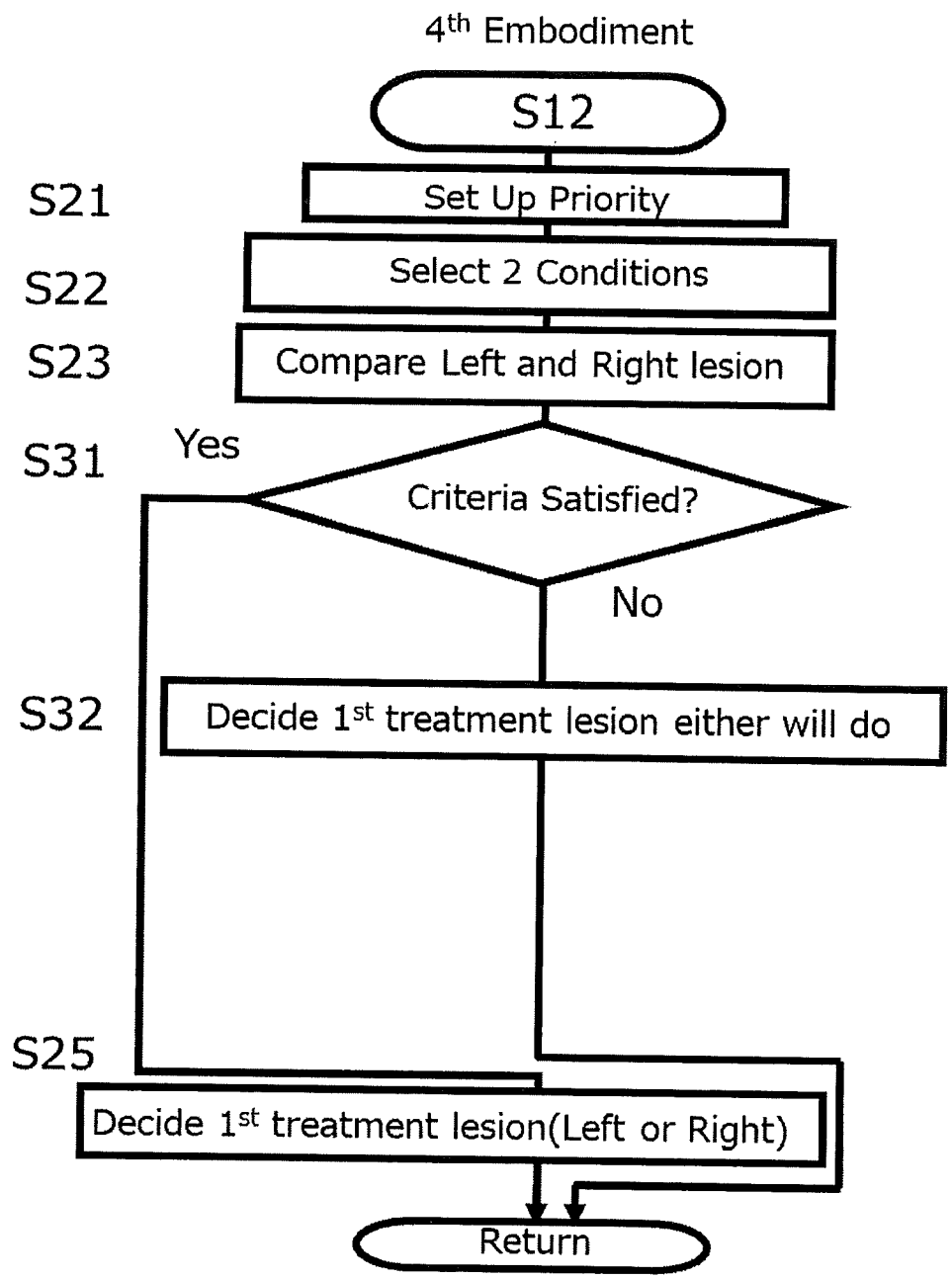
FIG. 12 is a subroutine flowchart of step S12, in which the lesion area to be treated first is to be determined, in a treatment method according to a fourth embodiment.

In the diagnostic method, the treatment was performed on the basis of the fourth embodiment shown in FIG. 12.

The interventional device was punctured into a left radial artery 72 of a patient having a stenosed site X1 in a left superficial femoral artery 51 and a CTO occluded site X2 in a right external iliac artery 61, the guide wire was placed in a blood vessel, the introducer sheath 12 was inserted, and then the guiding catheter 10 was introduced through the sheath introducer 40 after the dilator has removed.

Subsequently, the guiding catheter 10 was advanced from the left radial artery 72 to a patient's abdominal aorta so that the catheter tip 11 proceeded along the guide wire to a position in the vicinity of the aorta 70 of the aortailiac bifurcation 71.

Here, in order to first treat the stenosed site X1 of the left superficial femoral artery 51, which was distal to the aortailiac bifurcation 71, the catheter tip 11 was placed toward an entry port of a left common iliac artery. At this time, the guiding catheter 10 was contacted to the right side of the abdominal aorta.

The guide wire was passed through the stenosed site X1 by an operation of the guide wire on hand so as to press the distal end of the guide wire against the stenosed site in a state of supporting the guide wire with the guiding catheter 10. The number of times of trial was once. Subsequently, the inner catheter was removed, the balloon catheter 20 of the rapid exchange (RX) type was projected toward the stenosed site X1 along the guide wire and delivered to the stenosed site X1, and the balloon 21 was placed in the stenosed site X1.

Subsequently, an inflator was attached to the balloon catheter 20, and a liquid was injected to inflate the balloon 21, thereby expanding the stenosed site X1. After treatment, by operating the inflator of the balloon catheter 20, the balloon 21 was deflated and retracted from the stenosed site X1 to the hand-side, and then the guiding catheter 10 and the guide wire were also retracted to the hand-side in the same manner.

Next, a hand-hub of the guiding catheter 10 was rotated to direct the catheter tip 11 toward a right lower limb artery 60. The guide wire was inserted into an entry port of the right common iliac artery, and was placed beyond the CTO occluded site X2 of the right external iliac artery 61. The number of times of trial was once.

Subsequently, the catheter tip 11 was placed in the vicinity of the CTO occluded site X2, which was a lesion area of the right external iliac artery 61, along the guide wire.

The balloon catheter 20 was advanced into the placed guiding catheter 10 to project the balloon catheter from the catheter tip 11, and the balloon 21 was placed in the CTO occluded site X2. A liquid was injected from the inflator into the balloon catheter 20 to inflate the balloon 21, which was a treatment portion, so that the CTO occluded site X2 was expanded.

After treatment, the inflator was operated to deflate the balloon 21, the balloon catheter 20, the guiding catheter 10, and the guide wire were retracted toward the hand-side, and then were removed out of the body. At this time, although the guiding catheter 10 was found to remain bent within a range of 300 mm from the catheter tip 11 toward the proximal side, removal was successfully done without problem.

The duration of the treatment simulation from puncture to removal was 40 minutes.

Comparative Example 1

Here, except that the CTO occluded site X2 of the right external iliac artery 61 proximal to the aortailiac bifurcation 71 was treated first, the catheter tip 11 was placed to the aortailiac bifurcation 71 in the same method as in Example 1.

In order to first treat the CTO occluded site X2 of the right external iliac artery 61, the catheter tip 11 was placed toward the right lower limb artery 60 to expand the CTO occluded site X2. After treatment, by operating the inflator of the balloon catheter 20, the balloon 21 was deflated and retracted from the CTO occluded site X2 to the hand-side, and then the guiding catheter 10 and the guide wire were also retracted to the hand-side in the same manner.

Subsequently, a hand-hub of the guiding catheter 10 was rotated to direct the catheter tip 11 toward the left common iliac artery. However, since slight deformation of the guiding catheter 10 was found, the guide wire was inserted into an entry port of the left common iliac artery to make an attempt to advance the guide wire to the left superficial femoral artery 51. However, the guiding catheter tip 11a was stacked and was not advanced due to the bent shape of the left external iliac artery 2B and the left common femoral artery 3B. Insertion was unsuccessful even though the attempt was made three times, and thus the balloon catheter 20 was removed. An inner catheter was re-inserted into the guiding catheter and advanced as a catheter assembly, so that the stenosed site X1 was expanded.

The procedure time was 60 minutes.

Example 2

The same method as in Example 1 was performed except that an ultrasound image diagnosis catheter (IVUS) having a maximum outer diameter of 1.0 mm and an entire length of 2000 mm, a rapid exchange guiding catheter having an inner diameter of 1.6 mm, an outer diameter of 2.0 mm, a tube length of 300 mm at a distal end and an entire length of 2000 mm, and a guide wire having an entire length of 3800 mm and an outer diameter of 0.45 mm were used.

By using the image diagnosis catheter, the information about a state of an intravascular surface, and a length L and a degree of stenosis S of a lesion area before treatment of the lesion area was acquired, and after expansion of the lesion area, the stenosis degree S after the expansion and a necessity of a stent were checked. Also, the rapid exchange guiding catheter supported the passing of the image diagnosis catheter through the lesion area together with the guide wire for easier treatment.

Example 3

The same method as in Example 2 was performed using an image diagnosis catheter having an entire length of 2500 mm and a rapid exchange guiding catheter having an inner diameter of 1.5 mm, an outer diameter of 2.0 mm, a tube length of 1000 mm at a distal end and an entire length of 2500 mm, except that the stenosed site X1 was located at a position (Below the Knee: BTK) beyond the left popliteal artery.

By using the image diagnosis catheter, it was possible to check states of an intravascular surface before and after treatment of a lesion area, and a necessity of a stent. Also, the rapid exchange guiding catheter was placed between the catheter tip 11 and the lesion area, and supported the passing of the image diagnosis catheter through the left popliteal artery, which is the lesion area, together with the guide wire, so that the image diagnosis catheter was more easily placed at BTK and diagnosis and treatment were performed.

Example 4

The same manner as in Example 1 was performed using Table 3, except that a CTO occluded site X3 was present in the left common iliac artery, too. The CTO occluded site X2 in the right external iliac artery, which was more positionally distal than the CTO occluded site X3, was first subjected to treatment. The reason is that when there is a plurality of lesion areas in one lower limb artery, the removed thrombus becomes re-stenosed at the periphery, so that treatment is difficult, a procedure time is prolonged, an ability to concentrate is impaired due to surgeon's fatigue, and performance of a catheter and a guide wire are lowered and replacement thereof is required due to fatigue.

First, the atherectomy catheter was passed through the CTO occluded site X2 in the right external iliac artery 61 proximal to the aortailiac bifurcation 71, and the balloon catheter 20 was used for expansion. After treatment, by operating the inflator of the balloon catheter 20, the balloon 21 was deflated and retracted from the CTO occluded site X2 toward the hand-side, and then the first guiding catheter 10 and the guide wire were once removed after treatment of the CTO in the right external iliac artery was over. A second guiding catheter 10' (not shown) having an entire length of 1200 mm was inserted and placed together with the guide wire. The guide wire was replaced with one having an outer diameter of 0.45 mm and an entire length of 3500 mm, and the atherectomy catheter having an entire length of 1500 mm was passed through the CTO occluded site X3 in the left common iliac artery to remove the calcification lesion. An intravascular image catheter having an entire length of 1500 mm was used to diagnose an inside of the blood vessel and to check removal of the calcification lesion. Then, the intravascular image diagnosis catheter was removed from the body.

Subsequently, an over-the-wire type balloon having an entire length of 1500 mm, a diameter of 10 mm in a deflated state of balloon and a balloon length of 20 mm was placed and inflated in the lesion area X3. Then, the balloon was retracted to the second guiding catheter 10', and the guiding catheter and the balloon catheter were removed with the guide wire being remained. The reason is described: since the diameter was expanded due to the balloon inflation, the friction between the balloon and the guiding catheter increased and it was expected that it took time for removal.

The first guiding catheter 10 previously used was re-inserted along the guide wire, and the lesion area X1 was treated in the same sequence as Example 1.

The present invention is not limited to the above embodiments, and a variety of changes can be made within a technical spirit of the present invention by one skilled in the art. For example, the therapeutic catheter is not limited to the catheter having the balloon, and may be an atherectomy device having a cutting function, for example. The sequence of determining the lesion area X to be treated first may be implemented by a medical system having a computer.

Alternatively, in order to support the long guide wire, the treatment is performed by mechanical assistance, a robot, or assistance or operation of a machine having artificial intelligence installed therein, so that fall to an unclean area is prevented and treating is improved to shorten the surgical time and an operation time of the surgeon, to reduce the patient's burden and to save the cost.

Figure 13:
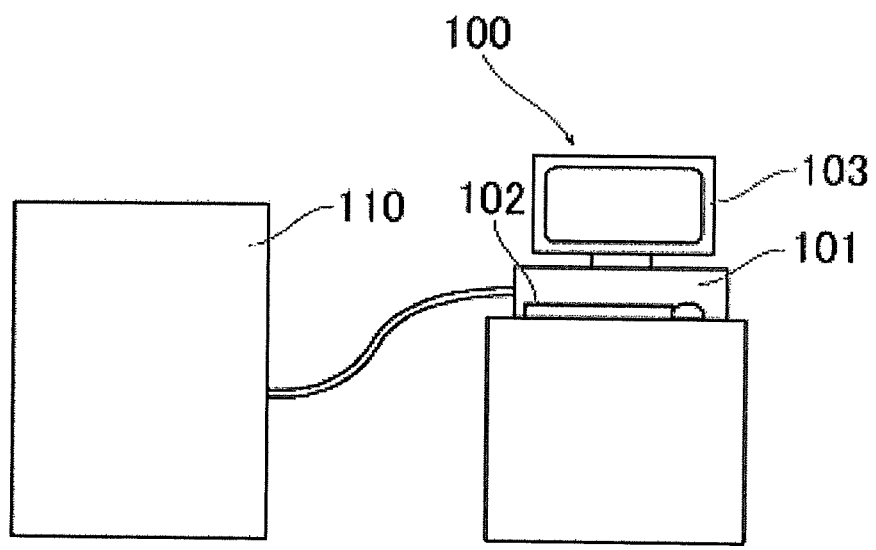
FIG. 13 is a schematic view of a medical system.

Also, the sequence of determining the lesion area X to be treated first may be implemented by a medical system 100 having a computer, as shown in FIG. 13. The medical system 100 includes a control unit 101 having an arithmetic circuit and a memory circuit, an interface 102 configured to receive data to the control unit 101, and an output unit 103. The interface 102 includes, for example, a keyboard, a mouse, a microphone, a data reading device and the like. The output unit 103 includes, for example, a monitor, a speaker, a data writing device, a printer and the like. The control unit 101 is, for example, a computer. The memory circuit is configured to store a program and a variety of parameters. The arithmetic circuit is, for example, a CPU (Central Processing Unit), and is configured to read the program and the divers parameters from the memory circuit and to execute arithmetic processing. The surgeon can input a variety of information from the interface 102. The control unit 101 may be communicatively connected to an image diagnosis device 110 configured to acquire image information by the interface 102. Thereby, the medical system 100 can acquire image information about a patient and information to be obtained from the image information from the image diagnosis device 110, as a digital signal or am analog signal. The control unit 101 is configured to read, from the interface 102, at least two pieces of information selected from the position of the lesion area X relative to the aortailiac bifurcation 71 of the patient, the stenosis degree S of the lesion area X, the bending degree B of the lesion area X, the length L of the lesion area X, the blood vessel diameter V of the lesion area X and the hardness H of the lesion area, as the comparative information. In the meantime, the control unit 101 may be configured to calculate (identify), as the comparative information, at least the two selected pieces of information from the information such as the image information to be acquired through the interface 102. Then, like the sequences in the first to third embodiments, the control unit 101 is configured to calculate the lesion area X to be treated first and to transmit the same to the output unit 103. The output unit 103 is configured to output a result of the lesion area X to be treated first. The surgeon can recognize the lesion area X to be treated first from the result from the output unit 103 and perform treatment.

As described above, the medical system 100 is a medical system 100 configured to treat a patient having lesion areas X in both left and right lower limb arteries, and includes an interface 102 configured to receive patient information to be input; a control unit 101 configured to receive, from the interface 102, at least two pieces of information selected from the position of each lesion area X relative to the aortailiac bifurcation 71 of the patient, the stenosis degree S of each lesion area X, the bending degree B of each lesion area X, the length L of each lesion area X, the blood vessel diameter V of each lesion area X and the hardness H of each lesion area X, as comparative information for comparison, or to calculate at least the two pieces of information from the received information, as the comparative information, and to determine a lesion area X to be treated first on the basis of at least the two pieces of selected comparative information about each of the lesion areas, and an output unit 103 configured to output a result determined in the control unit 101.

Since the medical system 100 configured as described above determines the lesion area X to be treated first by using at least two pieces of comparative information, it is possible to select reasonably and effectively a favorable order of treatments capable of realizing the desired effects, as compared to a configuration where one comparative information is used. Also, since the medical system 100 can automatically determine the favorable order of treatments by the control unit 101, it is possible to rapidly perform the treatment.

The detailed description above describes embodiments of a medical system and treatment method representing examples of the inventive medical system and treatment method disclosed here. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A diagnostic method for diagnosing which of plural lesion areas in a plurality of bifurcated lumens in a body of a patient should be treated first and which of the plural lesion areas in the plurality of bifurcated lumens in the body of the patient should be treated second, the plurality of bifurcated lumens being connected to a main lumen via a bifurcated portion, the method comprising:

acquiring information about the patient;

identifying one or more lesion areas present in each of the bifurcated lumens using the acquired information, the one or more lesion areas present in each of the bifurcated lumens being distal of the bifurcated portion;

acquiring data of first comparative information about one of the one or more lesion areas and data of second comparative information about the one of the one or more lesion areas, and acquiring data of the first comparative information about an other one of the one or more lesion areas and data of the second comparative information about the other one of the one or more lesion areas so that the data of the first and second comparative information about the one of the one or more lesion areas can be compared to the data of the first and second comparative information about the other one of the one or more lesion areas respectively to determine whether the one of the one or more lesion areas or the other one of the one or more lesion areas should be treated first via a radial artery of the patient, the first comparative information and the second comparative information each having a respective priority, the first comparative information and the second comparative information each having at least two associated criterion, and wherein the first comparative information about the one of the one or more lesion areas and the first comparative information about the other one of the one or more lesion areas includes positions of the one of the one or more lesion areas and the other one of the one or more lesion areas, and the positions of the one of the one or more lesion areas and the other one of the one or more lesion areas having a difference of at least 40 mm;

determining which of the one of the one or more lesion areas and the other one of the one or more lesion areas should be treated first using the priority and a selected one of the at least two associated criterion by advancing a guiding catheter with an inner catheter to the bifurcated portion without being beyond the bifurcation portion with the one of the one or more lesion areas and the other one of the one or more lesion areas being beyond the bifurcation portion;

the determining of which of the one of the one or more lesion areas and the other one of the one or more lesion areas should be treated first comprising: i) determining which of the first and second comparative information has a higher priority; and ii) comparing the data of the higher priority comparative information about the one of the one or more lesion areas and the other one of the one or more lesion areas according to the criterion selected to determine which of the one of the one or more lesion areas and the other one of the one or more lesion areas satisfies the criterion selected;

determining that the guiding catheter and the inner catheter are to be advanced along a single guidewire beyond the bifurcation portion into the one of the one or more lesion areas and the other of the one of the one or more lesion areas that is determined to be treated first, the one of the one or more lesion areas and the other of the one of the one or more lesion areas being beyond the bifurcation portion; and advancing the guiding catheter and the inner catheter beyond the bifurcation portion along the single guidewire to a different location after the single guidewire has been retracted to a position proximal of the bifurcation portion, the different location being into an other one of the one or more lesion areas and the other of the one of the one or more lesion areas after the one of the one or more lesion areas and the other of the one of the one or more lesion areas that is determined to be treated first has been treated.

2. The diagnostic method according to claim 1, wherein the main lumen is an aorta, the bifurcated portion is an aortailiac bifurcation, and the plurality of bifurcated lumens are left and right lower limb arteries.

3. The diagnostic method according to claim 1, wherein the first comparative information further includes a stenosis degree of the lesion area, and the second comparative information is one of a bending degree of the lesion area, a length of the lesion area, a blood vessel diameter of the lesion area or a hardness of the lesion area.

4. The diagnostic method according to claim 1, wherein the acquiring of the information about the patient includes acquiring electromagnetic wave information about the patient obtained based on a changed electromagnetic wave resulting after irradiating the patient with electromagnetic waves and detecting electromagnetic waves obtained through the patient, and the method further comprises acquiring plural pieces of information about each of the one or more lesion areas using the electromagnetic wave information.

5. The diagnostic method according to claim 1, wherein the acquiring of the information about the patient comprises acquiring non-electromagnetic wave information about the patient.

6. The diagnostic method according to claim 1, which is performed by assistance by artificial intelligence and/or by the artificial intelligence.

7. The diagnostic method according to claim 6, wherein the artificial intelligence includes machine-learning.

8. The diagnostic method according to claim 1, further comprising:
determining that the guiding catheter and the inner catheter is to be advanced beyond the bifurcation portion toward the one of the one or more lesion areas.

9. The diagnostic method according to claim 1, further comprising:
determining that the guiding catheter and the inner catheter is to be advanced beyond the bifurcation portion toward the one of the one or more lesion areas and the other of the one of the one or more lesion areas.

10. A treatment method for treating a patient having lesion areas in both left and right lower limb arteries, the method comprising:
selecting, from information about the patient for the treatment method via a radial artery of the patient, i) a position of each lesion area relative to at least an aortailiac bifurcation, the position of each lesion area relative to the at least the aortailiac bifurcation being distal to the aortailiac bifurcation, and wherein the position of each lesion area relative to each other has a difference of at least 40 mm, and at least one item of information selected from: ii) a stenosis degree of each lesion area, iii) a bending degree of each lesion area, iv) a length of each lesion area, v) a blood vessel diameter of each lesion area, and vi) a hardness of each lesion area, as comparative information for comparison, each of the items of information having an associated priority, and each of the items of information having at least two associated criterion;
the selecting of the at least one item of information as the comparative information for comparison including selecting the item of information having a highest priority;
determining one of the lesion areas to be treated first before treating an other of the lesion areas using the item of information having the highest priority as the comparative information, the one lesion area to be treated first being determined by identifying the lesion area that satisfies a selected one of the at least two associated criterion for the item of information having the highest priority;
introducing a catheter into the radial artery of an arm of the patient, and advancing and placing a distal part of the catheter along a single guidewire to the aortailiac bifurcation of the patient without being beyond the aortailiac bifurcation, and wherein the one of the lesion areas and the other of the lesion areas are located beyond the aortailiac bifurcation;
inserting a therapeutic catheter into a lumen of the catheter after the placing of the distal part of the catheter to the aortailiac bifurcation of the patient, advancing the catheter and the therapeutic catheter beyond the aortailiac bifurcation along the single guidewire, projecting the therapeutic catheter distally beyond the distal part of the catheter, and treating first the one lesion area determined as being treated first by the therapeutic catheter;
retracting the distal part of the catheter and the single guidewire to the aortailiac bifurcation of the patient without being beyond the aortailiac bifurcation;
advancing the catheter beyond the aortailiac bifurcation to the other lesion area along the single guidewire, the other lesion area being beyond the aortailiac bifurcation in a different limb than the one lesion area; and
treating the other lesion area after the treating the one lesion area.

11. The treatment method according to claim 10, wherein the catheter is also used in treating the other lesion area after the treating of the one lesion area.

12. The treatment method according to claim 10, wherein the therapeutic catheter is also used in treating the other lesion area after the treating of the one lesion area.

13. The treatment method according to claim 10, wherein after treating the one lesion area to be treated first, the therapeutic catheter is removed from the catheter, and a second therapeutic catheter is used in treating the other lesion area after the treating of the one lesion area.

14. The treatment method according to claim 10, wherein the catheter is a guiding catheter, and a catheter assembly having an inner catheter inserted in a lumen of the guiding catheter is used in the placing of the distal part of the catheter to at least the aortailiac bifurcation of the patient.

15. The treatment method according to claim 10, further comprising:
advancing the catheter to the aortailiac bifurcation along the single guidewire.

16. The treatment method according to claim 15, further comprising:
placing the catheter in a vicinity of the one lesion area;
placing the single guidewire at a position beyond the one lesion area; and
projecting the therapeutic catheter distally beyond the distal part of the catheter from an opening of a catheter tip of the catheter.

17. The treatment method according to claim 16, further comprising:
placing the catheter tip of the catheter in a vicinity of the other lesion.

18. The treatment method according to claim 17, further comprising:
placing the catheter tip of the catheter in the aorta without being beyond the aortailiac bifurcation;
placing the single guidewire at a position beyond the other lesion; and
advancing the therapeutic catheter along the single guidewire and into the other lesion.

19. A medical system for assisting treatment of a patient, comprising:
an interface configured to receive inputted information about the patient;
a control unit configured to either receive, from the interface, i) a position of a lesion area relative to an aortailiac bifurcation of the patient, the position of each lesion area relative to the at least the aortailiac bifurcation being distal to the aortailiac bifurcation, and wherein the position of each lesion area relative to each other has a difference of at least 40 mm, and at least one item of information for a treatment method via a radial artery of the patient selected from: ii) a stenosis degree of the lesion area, iii) a bending degree of the lesion area, iv) a length of the lesion area, v) a blood vessel diameter of the lesion area, and vi) a hardness of the lesion area, as comparative information for comparison, or to calculate at least the position of the lesion area relative to the aortailiac bifurcation of the patient and one or more of the at least one item of information, the items of information from the received inputted information, as the comparative information, each of the items of information having an associated priority, and each of the at least two items of information having at least two associated criterion;

the control unit being configured to determine one lesion area to be treated first via the radial artery of the patient, before treating an other lesion area, using the item of information having the highest priority as the comparative information and advancing a guiding catheter with an inner catheter to the aortailiac bifurcation without being beyond the aortailiac bifurcation, and wherein the one lesion area and the other lesion area are beyond the aortailiac bifurcation;

the control unit being configured to determine the one lesion area to be treated first by identifying the lesion area that satisfies a selected one of the at least two associated criterion;

the control unit being configured to determine that the guiding catheter and the inner catheter are to be advanced beyond the bifurcation portion along a single guidewire and into the one of the one or more lesion areas and the other of the one of the one or more lesion areas that is determined to be treated first, the one of the one or more lesion areas and the other of the one of the one or more lesion areas being beyond the bifurcation portion and that the guiding catheter and the inner catheter is to be advanced beyond the bifurcation portion along the single guidewire to a different area after the single guidewire has been retracted to a position proximal of the bifurcation portion, the different location being into an other one of the one or more lesion areas and the other of the one of the one or more lesion areas after the one of the one or more lesion areas and the other of the one of the one or more lesion areas that is determined to be treated first has been treated; and an output unit configured to output a result determined by the control unit to identify the one lesion area to be treated first.

\* \* \* \* \*